United States Patent [19]
Gothard

[11] 3,818,678
[45] June 25, 1974

[54] METHODS OF AND APPARATUS FOR SEPARATING SOLID AND LIQUID PARTICLES FROM AIR AND OTHER GASES

[76] Inventor: Nicholas Gothard, c/o Filteron International, Inc., 2322 Irving Blvd., Dallas, Tex. 75207

[22] Filed: Dec. 15, 1972

[21] Appl. No.: 315,416

Related U.S. Application Data

[60] Division of Ser. No. 159,690, July 6, 1971, which is a continuation-in-part of Ser. No. 793,224, Jan. 13, 1969, which is a continuation of Ser. No. 629,465, April 10, 1967.

[52] U.S. Cl. .................................................. 55/13
[51] Int. Cl. .............................................. B03c 3/06
[58] Field of Search ......... 55/2, 101, 103, 130, 139, 55/146, 150, 154, 155, DIG. 38, 135, 5, 6, 10, 13, 112, 113, 118, 120, 123, 129, 131, 136, 141; 310/2, 6; 317/262 R; 204/188, 299, 300, 301, 302, 303, 304, 180 R, 186; 250/527, 531; 209/127 R; 23/288 R, 288 F

[56] References Cited
UNITED STATES PATENTS

| | | | |
|---|---|---|---|
| 3,129,157 | 4/1964 | Loeckenhoff | 204/180 |
| 3,304,251 | 2/1967 | Walker et al. | 204/184 |
| 3,431,441 | 3/1969 | Shair | 55/151 X |

*Primary Examiner*—Dennis E. Talbert, Jr.
*Attorney, Agent, or Firm*—Strauch, Nolan, Neale, Nies & Kurz

[57] ABSTRACT

Processes and systems for separating solid and/or liquid particles from air or other gases in which the gas is caused to move with the particles dispersed in it to the highest intensity region of a non-uniform electrical field where the particles are collected.

12 Claims, 31 Drawing Figures

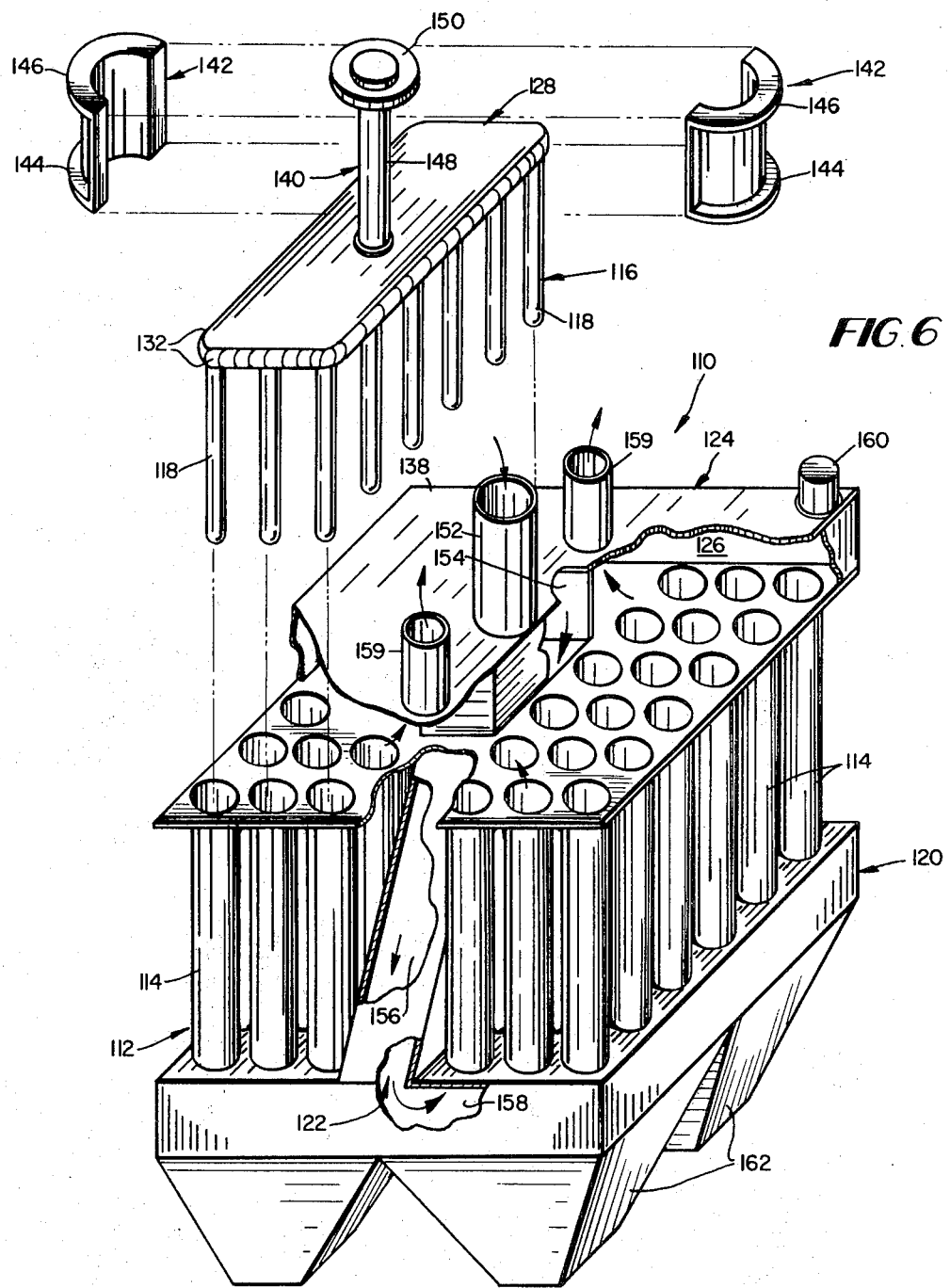

| Geometry | V | E | $G_{max}$ | k |
|---|---|---|---|---|
| (coaxial cylinders) | $aE_{max} \ln(\frac{b}{a})$ | $\frac{V_a}{a \ln(\frac{b}{a})} \hat{r}$ | $2\left|\frac{E^2_{max}}{a}\right|\hat{r}$ | — |
| (concentric spheres) | $aE_{max}(1-\frac{a}{b})$ | $\frac{bV_a}{a(b-a)}\hat{r}$ | $4\left|\frac{E^2_{max}}{a}\right|\hat{r}$ | — |
| (hyperbolic, $xy=b^2$) | $aE_{max}$ | $E(a, y \text{ large}) = \frac{V_0}{a}\hat{x}$<br>$E(x \text{ large}, a) = \frac{V_0}{a}\hat{y}$ | $\frac{2aE^2_{max}}{b^2}$ | — |
| (cylinder in rectangular enclosure) | $\frac{aE_{max}\ln(\frac{b}{a})}{k}$ | $\frac{kV_0}{a\ln(\frac{b}{a})}$ | $\frac{2k^2E^2_{max}}{a}$ | 0.93 |

FIG. 30a

| | V(a) | Emax | Gmax | k |
|---|---|---|---|---|
| (diagram: rectangular waveguide with 2b, 2a, r) | $\frac{aE_{max}\ln(b/a)}{k}$ | $\frac{kV_0}{a\ln(b/a)}$ | $\frac{2k^2 E_{max}^2}{a}$ | 0.88 |
| (diagram: helical, 2a, y, x, θ₀, V₀) | $\frac{a\theta_0 E_p}{k}$ | $kE_p$ | $\frac{2k^2 E_p^2 \sin\theta_0}{a}$ | 0.91 |
| (diagram: corrugated, a, y, x, θ₀, V₀) | $\frac{a\theta_0 E_p}{k}$ | $kE_p$ | $\frac{2k^2 E_p^2 \sin\theta_0}{a}$ | 0.91 |

$$E_p = \left[\frac{V_0}{\theta_0(a^2 + y^2\tan^2\theta_0)}\right]\left[y\tan^2\theta_0\,\hat{x} - a\tan\theta_0\,\hat{y}\right]$$

*FIG. 30b*

METHODS OF AND APPARATUS FOR SEPARATING SOLID AND LIQUID PARTICLES FROM AIR AND OTHER GASES

RELATION TO THE OTHER APPLICATIONS

This is a division, of application Ser. No. 159,690, filed July 6, 1971 which is a continuation-in-part of application Ser. No. 793,224 filed Jan. 13, 1969. Application Ser. No. 793,224 is a continuation of application Ser. No. 629,465 filed April 10, 1967.

The present invention relates to gas separation methods and apparatus and, more specifically, to methods and apparatus for separating solid and liquid particles in which air and/or other gases having the particles dispersed therein are passed through nonuniform electrical fields and, at the same time, exposed to a current which is not large enough to charge the particles but is large enough to cause limited ionization of the gas. The object of the separation may be either the purification of the gas or the recovery of the solid or liquid.

A wide variety of techniques for separating particulate materials from air and other gases have heretofore been proposed. Among these are inertial or cyclone separators, scrubbers, filters, and electrostatic precipitators.

Inertial separators are widely used, but have the drawback that they do not remove small particles because the latter tend to be essentially inertialess.

Scrubbers, of which there are several types, are also extensively used. However, scrubbers are, as a rule, expensive to manufacture and install. They also tend to be expensive to operate because of high power requirements and because they employ parts which have a short service life.

A variety of filter type separators have also been developed for different purposes. Again, however, such devices have their limitations. For example, cleaning often presents a problem. Also, for the most part, filters are not practical where liquid or hygroscopic particles are to be removed. Further, such devices are impractical for applications involving high flow rates.

Electrostatic precipitators are used extensively because they have a high collection efficiency for all but small particles and are useful where large volumes of gas are to be cleaned. In this type of separation device, the gas to be cleaned flows between two oppositely charged electrodes across which a high enough electrical potential to produce a corona discharge is maintained. As the particles move through the corona discharge, they are charged and attracted to the electrode having the opposite polarity. [1]

[1] Such devices may also be of the two-stage type in which the particles are charged by a corona discharge field in a first stage and then separated in a second stage by passing the gas in which they are dispersed between charged electrodes.

While useful for many purposes, this type of device is by no means without drawbacks. For example, electrostatic precipitators cannot be employed to separate particles having high conductivity. On the other hand, particles having extremely low conductivity will coat out on and insulate the electrode to which they are attracted and thereby cause a decrease in efficiency. Also, such devices are expensive; the employment of corona producing elements such as thin wires makes them very fragile mechanically; and precleaners may be required where large particles are present.

Another and important disadvantage of this type of device is that relatively large amounts of ozone are produced by the corona discharge. Ozone is deadly in even small concentrations; and electrostatic precipitators can accordingly not be employed in closed areas.

U.S. Pat. Nos. 3,110,580 issued Nov. 12, 1963, for DEVICE FOR AGGLOMERATING MICROSCOPIC PARTICLES and 3,304,251 issued Feb. 14, 1967, for SEPARATION OF WAX FROM AN OIL DISPERSION USING A NONUNIFORM ELECTRICAL FIELD; published Japanese Pat. Publication No. 293,153 dated Nov. 25, 1950, for ELECTRICAL DUST-CATCHING EQUIPMENT; and German Pat. No. 571,159 dated Feb. 24, 1933, for VERFAHREN ZUR ABSCHEIDUNG VON SCHWEBEKORPEN AUS GASEN MITTEL EINES SPRUHENTALLADUNGSFRIEN ELEKTRISCHEN FELDS, suggest that yet another electrical phenomenon, a non-uniform electrical field, can be employed to separate particles from gases although none of these patent publications contains any concrete information as to how a non-uniform field can be employed for this purpose; i.e., they do not disclose any of the parameters or relationships among parameters which must be observed in order to separate particles from gases by using a non-uniform field.

Accordingly, it must necessarily be assumed that the devices proposed in these patents were intended to operate in a manner in which they would be expected to produce the highest efficiency as predicted by the accepted theory governing the motion of particles in non-uniform fields. At the time the applications maturing into the foregoing publications were filed and at the present time as well, the theory in question[2] states that, if an uncharged dielectric particle is placed in a non-uniform electrical field in which there is essentially no current flow, a net force attributable to the spatial non-uniformity of the field will drive the particle toward the region of the field in which the field intensity is the highest at a velocity proportional to the size of the particle. Practice confirms this theory; fields as heretofore disclosed are efficient where the particles to be collected are of relatively large (e.g., 100 micron) size. However, as the particle size decreases, collection efficiencies of the heretofore proposed separation devices employing non-uniform fields decrease markedly. Consequently, such devices are not practical for applications where small particles (in the sub to 10 micron range, for example) are involved.

[2] See, for example, Polar Molecules, by Peter Debye. The Chemical Catalog Company, Leipzig (1929);
Herbert A. Pohl, "The Motion and Precipitation of Suspensoids in Divergent Electric Fields," J. Appl. Phys., 22,869 (1951);
H. F. Kraemer, "Properties of Electrically Charged Aerosols," Technical Report No. 12, Engr. Experiment Station, Univ. of Illinois, Mar. 31, 1954;
L. Silverman et al., "Electrostatic Mechanism in Aerosol Filtration by Mechanically Charged Fabric Media and Related Studies," USAEC REPORT NYO-4610, Sept. 4, 1956;
Herbert A. Pohl, "Some Effects of Nonuniform Fields on Dielectrics," J. Appl. Phys., 29, 1182 (1958);
H. A. Pohl and J. P. Schwar, "Factors Affecting Separations in Nonuniform Electric Fields," J. Appl. Phys., 30, 69 (1959);
H. A. Pohl and J. P. Schwar, "Particle Separations by Non-uniform Electric Fields in Liquid Dielectrics. Batch Methods," J. Electrochemical Society, 107, 386 (1960);
H. A. Pohl and C. E. Plymale, "Continuous Separations of Suspensions by Nonuniform Electric Fields in Liquid Dielectrics," J. Electrochemical Society, 107, 390 (1960);
Herbert A. Pohl, "Nonuniform Electric Fields," Scientific American, 103, 107 (1960);
R. B. McEven, "Method and Apparatus for Dielectrophoretic Separation of Polar Particles" U.S. Pat. No. 3,197,393, Mar. 27, 1961;
V. C. P. Morfopoulos, "Use of Inhomogeneous Electrical Fields in Processes Influenced by Electrical Fields," U.S. Pat. No. 3,447,049, May 5, 1965; and V. C. P. Morfopoulos and N. Arbiter, "Contribution to the Science of Electrostatic Separation-Dielectric Forces in Inhomogeneous Fields," Soc. of Mining Engineers, 352, Dec. (1965).

I have now invented a novel process and apparatus for separating solid and liquid particles from air and other gases which resembles that just described to the extent that a non-uniform field is employed. However, my method and apparatus operate in a completely different manner and have a quite different capability in that they collect particles of even submicron size in very short periods (on the order of seconds) with efficiencies approaching 100 percent.

In one important respect my novel technique of separating particles from air and other gases differs from that just described in that I deliberately produce a small current flow from one to the other of the two conductors between which the non-uniform field is established.[2a] As will be explained in detail later, this current ionizes a small number of the gas molecules flowing through the non-uniform field. These molecules act as sites about which uncharged particles tend to cluster and form what I term an "ensemble"[3] of gas molecules. These ensembles therefore constitute aggregations of molecules which can be acted on collectively by the force created by the non-uniform electrical field and moved toward the high intensity region of the non-uniform field. The force is accordingly appreciably greater than that which can be exerted on a single gas molecules and substantial velocities can be imparted to the ensembles. At the same time, I keep the ionizing current sufficiently low that the particles of material being separated are not charged to the point where they will move by electrophoresis.

[2a] This deliberate provision of a small current readily distinguishes my invention from the technique described in the above-cited German Pat. No. 571,159 in which it is stated that there should be no current flow.

[3] It will be obvious to those conversant with the relevant arts that these ensembles do not exist as discrete, physically isolatable entities. Rather, they are best-thought of in terms of the electrical charge distribution in the gas flowing through the non-uniform field.

Because of the movement of the gas toward the high intensity region of the non-uniform field, the movement of the dispersed particles relative to the gas is materially lower than in the previous separation devices employing non-uniform electrical fields. Therefore, the drag forces on the particles are much lower (in some cases so small as to be non-existent for all practical purposes). Consequently, the very small forces available to move particles of small size are nevertheless much larger than the opposing drag forces; and even these small particles move to the high intensity region of the non-uniform field with velocities which give collection times as low as a few seconds. Also, because of the reduction in drag forces, collection times are shorter and efficiencies higher, even where larger particles are involved.

From the foregoing it will be apparent that my novel technique has a combination of advantages which is not even remotely approached by the devices heretofore available for separating particles from air and other gases. Specifically, it can be used to separate particles which are too small to be removed by many heretofore available methods including those employing non-uniform fields. Also, separation devices according to the present invention have extremely high efficiencies, even in applications involving extremely small particles or a wide range of particle sizes.

In addition, particle separation or removal devices in accord with the present invention are simple and have extremely low power requirements. They are accordingly relatively inexpensive to manufacture and install and to operate and maintain.

Yet another advantage of the instant invention is that, in contrast to electrostatic devices, there is no generation of ozone. Therefore, apparatus in accord with my invention can be employed in closed, inhabited areas and in other applications where the electrostatic devices cannot be used because of the high mammalian toxicity of ozone.

Yet another advantage of the present invention is that it can be employed to remove liquid and hygroscopic as well as non-hygroscopic solid particles. Also, devices employing its principles are capable of handling large volumes of gas; and high flow rates can be readily accommodated. Furthermore, collected particles can be readily removed from the separation devices by any of a variety of techniques.

Still another advantage of my invention is that pressurization of the gases from which particles are to be separated is not required. Consequently, separation by the techniques I have invented can and normally will be a continuous type process in contrast to the batch-type techniques such as described in the above-cited German Pat. No. 571,159.

Another advantage of my invention, not possessed by separators of the charged particle type, is that accumulation of collected particles on a collecting electrode poses no problems inasmuch as this causes no decrease in efficiency. In fact, as will be discussed in detail later, a buildup of collected particles can be employed to increase operating efficiencies in certain applications of the invention.

A further advantage of my invention is that devices in accord with its principles are capable of operating efficiently under variable operating conditions. Still another highly important advantage of my invention is its versatility. The following are merely exemplary of the uses to which it may be put on an economically practical basis:

Removal of the pollutants from the intakes and exhausts of internal and external combustion engines Vapor and fluid particle reduction to liquid phase in desalinization, stream generation, heat exchange, and other processes Elimination of pollutants from gases generated by incineration and burning Petrochemical industry waste reduction and condensation Intake and exhaust and on location dust and pollution elimination from industrial plants Mining and crushing intake and exhaust gas cleaning Cleaning of air for living and working spaces, air intake helmets, and the like.

One important and primary object of the present invention resides in the provision of novel, improved methods of and apparatus for separating particulate solids and liquids from air and other gases. Other related and important but more specific objects of the present invention reside in the provision of methods and apparatus in accord with the preceding object:

1. which have high operating efficiencies, even where very small particles or a wide distribution of particle sizes are involved.
2. which, in conjunction with the preceding object, employ a non-uniform electrical field, but are capable of separating smaller particles than can be separated by devices employing non-uniform fields as heretofore proposed in periods of reasonable durations.
3. in which, in conjunction with the preceding object, there is a low magnitude current (so low that it is not capable of charging the particles) between the field establishing conductors or electrodes which results in reduced drag forces on the particles being collected so that even the weak forces available to act on very small particles will move the latter to the region in which they are collected at velocities producing very short collection times.
4. which are relatively inexpensive to manufacture, install, and operate and which have a long service life.
5. which do not generate appreciable quantities of ozone during operation and can accordingly be used in applications where the presence of ozone cannot be tolerated.
6. which can handle large volumes of gases and which are capable of accommodating high flow rates.
7. which are capable of maintaining high collection efficiencies despite the accumulation of collected particles.
8. which are capable of operating efficiently under variable operating conditions.
9. which are highly versatile.
10. which, in conjunction with the preceding object, can be employed in applications where purification, decontamination, or reduction in the liquid content of a gas is the goal, and applications where recovery of a substance or substances mixed with the gas is the goal as well as in the removal of solid particles from gases.
11. that employ devices from which collected particles can readily be removed.
12. which have various combinations of the foregoing attributes.

Other important objects and novel features and additional advantages of the present invention will become apparent from the appended claims and as the ensuing detailed description and discussion of the invention proceeds in conjunction with the accompanying drawing, in which:

FIG. 6 is a pictorial and partially exploded view of apparatus in accord with the present invention which is intended for removing particles from gases on a large volume scale;

FIGS. 30a and 30b show mathematical relationships for certain exemplary embodiments of the invention.

In the process of separating solid and liquid particles from gases which I have invented, the gas in which the particles to be separated are dispersed is caused to flow through a non-uniform, high-density electrical field established by creating a high potential between cooperating, electrically isolated conductors. As the gas traverses the electrical field, the field exerts a force on the particles mixed with the gas, deflecting or moving these particles to the region of the field where the field intensity or strength is the highest. Here the particles can be trapped or collected. The gas, then essentially free of particulate material, can be removed from the apparatus through a suitable outlet or offtake. It will be shown later that this process can be practiced in devices of widely varying configuration.

As discussed briefly above, the basic mechanism of this novel technique I have invented for separating particles from gases differs markedly from the "prior art" technique of employing non-uniform fields. More specifically, the motion of particulate matter in a fluid under the influence of a non-uniform field as established in heretofore proposed devices employing such fields depends on a force balance given by the equation:

$$F_e = F_D + F_I \quad (1)$$

where $F_e$ and $F_I$ are the non-uniform electrical and inertial forces on a single particle in the field, and $F_D$ is the drag force on the particle as it moves through the fluid. The electrical force, $F_e$, depends on the voltage applied to the conductors between which the non-uniform field is established. The drag force, $F_D$, depends on the particle radius, the particle velocity relative to the fluid and the viscosity of the fluid through which the particle moves.

In the prior art systems the viscous drag force $F_D$ is much larger than the inertial force $F_I$ for times of interest for practical fluid cleaning systems because they operate by propelling the particles being separated through a fluid medium of appreciable viscosity which is stationary or moving in a different direction than the particles. In this case:

$$F_e = F_D \quad (2)$$

In terms of the physical variables pertaining to the prior art devices, Equation (2) takes the form:

$$3\epsilon_1 V^2 (K-1) ([4/3]\pi R^3)/r^3 (\ln[b/a])^2 (K+2) = 6\pi\mu Rv$$

Figure 1:
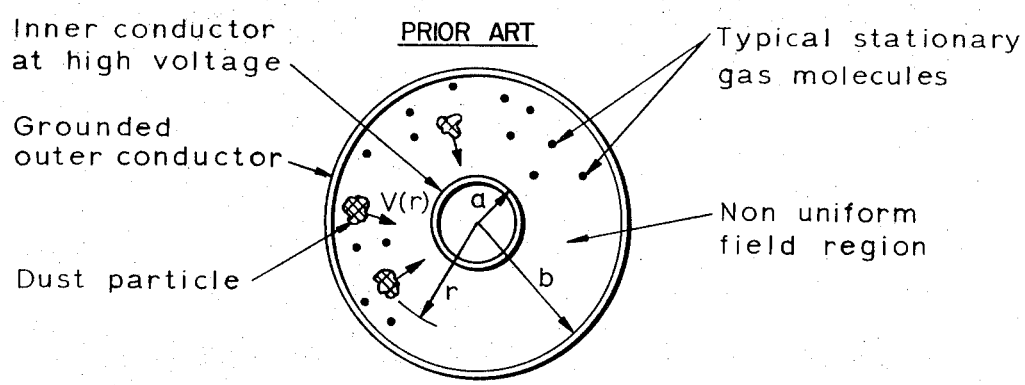
FIG. 1 is a diagrammatic representation of a device for separating particles from gases which employs a non-uniform field in accord with currently taught precepts.

The solution for the radial velocity for a particle of radius $R$ in a prior art device of the configuation illustrated in FIG. 1 is given by the formula:

$$v(r) = 2\epsilon_1 R^2 (K-1) V^2/3\mu r^3 (K+2) (\ln[b/a])^2 \quad (3)$$

where $\mu$ is the absolute viscosity of the fluid in the annulus, $V$ is the applied voltage at $r = a$, $\epsilon_1$ is the permittivity of the fluid, and $K$ is the relative dielectric constant of the particle with respect to the fluid. An average radial drift time $T$, i.e., the time required for a particle to move from $r = b$ to $r = a$, may also be calculated from Equation (3) by a simple integration. This equation is as follows:

$$T = 3\mu (b^4 - a^4)(K+2)(\ln[b/a])^2/8\epsilon_1 R^2 (K-1) V^2 \quad (4)$$

From the geometric constants of a separator and Equation (3) a formula for the efficiency of a device of the type in question can be calculated. This formula is:

$$\eta = 1 - \exp[-Av/Q] \quad (5)$$

where $A$ is the surface area of the collecting region, $Q$ is the volumetric flow rate, and $v$ is the average drift velocity of the pollutant particles to the collecting region as given by Equation (3).

The following table gives collection times and efficiencies for a typical device operating in accord with the foregoing Equations:[4]

[4] That "prior art" hardware performs in accord with the analytical predictions of Equations (3), (4), and (5) is apparent from U.S. Pat. No. 3,304,251.

TABLE I

| $b = 5''$ | axial velocity = 1 ft/sec |
| $a = 2''$ | = 2.5 |
| Voltage = 100kV | $\mu = 1.8 \times 10^{-5}$ kg/msec |
| Length = 4'–0'' | |

| Particle Size (diameter) | Collection Time | Collection Efficiency (%) |
| --- | --- | --- |
| 100$\mu$ | 10 secs. | 23 |
| 10$\mu$ | 1,000 secs. (8¾ hrs.) | 0.23 |
| 1$\mu$ | 100,000 secs. (278 hrs.) | 0.0023 |
| 0.3$\mu$ | 1,000,000 secs. (2,780 hrs.) | $2.3 \times 10^{-5}$ |

As is readily apparent from the foregoing table, collection times become impossibly long and efficiencies impractically low as particle sizes decrease significantly below 100 microns.

Many, if not most, separation problems involve the collection of particles in the sub-micron range as well as larger particles which are nevertheless well below the size which the "prior art" devices can collect with useful efficiencies in suitably short collection times. Accordingly, as far as the separation of particles from gases is concerned, such devices have remained laboratory curiosities.

In contrast to that just described, the novel separation process I have invented provides high collection efficiencies and extremely short collection times, even when the particles being collected are of sub-micron size.

In my novel process, viscous drag forces on the particles being separated are substantially reduced (or even made so small as to be essentially non-existent) by causing the gas in which the particles are dispersed to move with the particles to the maximum intensity region of the non-uniform field. As gases have relative dielectric constants approaching unity, this requires that the gas be polarized so that the gas atoms will move collectively in an ensemble to the maximum field intensity region. That is, the forces due to the field which is available to act on a single, polarized, non-interacting atom or molecule as postulated in the theories currently in vogue are not sufficiently large to produce the desired flow of the gas to the maximum intensity field region. However, I have found that the requisite collective motion of the gas can be obtained by creating a small current between the conductors across which the non-uniform field is established. It is believed that this small current produces a slight degree of ionization in the gas and that neutral gas molecules are attracted to the ionized molecules, thereby forming molecular clusters which are large enough to be subjected to substantial polarization forces (it appears that the theoretical cluster size must be at least 10 to 20 molecular diameters for the gas to move with the particulate).

AS in the case of the prior art devices, the operation of the novel separation devices I have invented can be explained in mathematical terms, specifically in terms of an equation which includes the non-uniform field force $F_e$ and the inertial force $F_I$. For my invention, Equation (1) takes the form:

$$F_e = F_I \tag{6}$$

Figure 2:
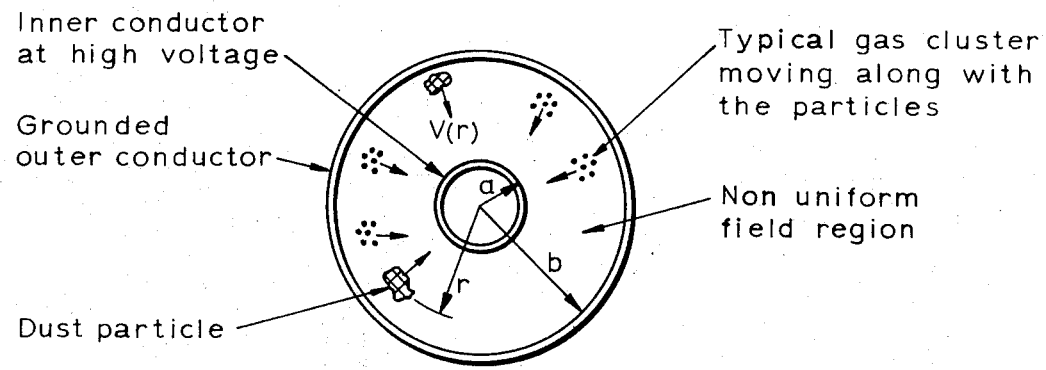
FIG. 2 is a similar representation of a device having comparable geometry for separating particles from gases in accord with the principles of the present invention.

In situations where the electric field is inversely proportional to the radial distance leading to the origin of the coordinate, system Equation (6) takes the form:

$$d^2r/dt^2 = (\Omega/\rho)\, 1/r^3 \tag{7}$$

where $\Omega$ is a proportionality constant dependent on voltage and the dimensions of the structure, e.g.:

$$\Omega = 3c_0\,(K - 1/K + 2)\,(V/\ln[b/a])^2$$

for coaxial structures as shown in FIG. 2.

The solutions to Equation (7) subject to the boundary condition at $t = 0$, $r = r_0$ and $V = dr/dt = 0$ are:

$$r = r_0\,\sqrt{1 - [\Omega/\rho/r_0^4\,]t^2} = \sqrt{r_0^2 - [(\Omega/\rho)/r_0^2]t^2} \tag{8}$$

$$t = r_0^2/\sqrt{\Omega/\rho}\,\sqrt{1 - (r/r_0)^2} \tag{9}$$

$$dr/dt = v = \sqrt{(\Omega/\rho)/r}\,\sqrt{1 - (r/r_0)^2} = -\Omega/\rho t/r_0 \sqrt{r_0^4 - (\Omega/\rho)t^2} \tag{10}$$

Also, with reference to FIG. 2, it is possible to calculate the average drift velocity for the present invention from the last equation. This drift velocity equation is as follows:

$$(v = (1-S)\,[(3\epsilon_1/\rho)(k-1/k+2)\,]^{1/2}\,[V/\ln(b/a)(b-a)]\,\{\ln[1+\sqrt{1-(a/b)^2}/a/b\,] - \sqrt{1-(a/b)^2}\}$$

In conjunction with the foregoing, the velocity of the gas phase in the novel devices I have invented is not identical to the drift velocity of the particles in actual practice; i.e., there is a slip between the gas and particle phases which depends upon the size and distribution of the particles, the particle density, and the characteristics of the gas in which the particles are dispersed. The slip is mathematically described by the formula:

$$S = v_I - v_{OBS}/v_I \tag{11}$$

where $v_I$ is as defined in Equation (7) and $v_{OBS}$ is the observed drift velocity of the particles under specific operating conditions. However, it does not appear that slip is a limiting factor because of the close correlation between observed results and calculated results in which slip is disregarded.

The equation for efficiency applicable to my invention is also (5). However, "$v$" in Equation (5) is calculated by Equation (7) above rather than Equation (3) as in the case of those heretofore proposed separation devices employing non-uniform fields.

Calculated efficiencies and collection times agree closely with actual test results as shown by the data for the operation of a typical embodiment of my invention tabulated below:

TABLE II

| $a$ = 1.75 in. | Length = 48 in. |
|---|---|
| $b$ = 5.0 in. | Volumetric Flowrate = 28.5 c.f.m. |
| V = 100 kV | Particle Size 0.3$\mu$ (highly uniform) |

| | Calculated | Observed |
|---|---|---|
| Collection Time | 1.75 sec. | 1.56 sec. |
| Efficiency | 90.6% | 93% |

Also, as can be readily seen from a comparison of the data in Tables I and II, the devices of the present invention are much more efficient separators of small particles than those predictable from the theories governing the effects of non-uniform fields.

It is important, in operating devices of the type I have invented, that the current flowing between the electrodes be carefully regulated. Specifically, the maximum current density must be kept in the range of $10^{-12}$ to $10^{-6}$ ampere per square centimeter. At higher current densities, unwanted corona discharge will occur; and the system will operate as an electrostatic precipitator instead of in the desired manner. At current densities below the minimum specified above, the gas will not be ionized to the extent necessary to produce the collective polarization of the gas required for flow of the gas to the maximum field intensity region of the non-uniform field.

In regard to the preceeding paragraph, the force available to move the gas to the high intensity region of the non-uniform field is proportional to the dielectric constant $K$ of the gas traversing the non-uniform electrical fields and the dielectric constant is in turn proportional to the theoretical cluster size as shown by the following equation;

$$K = (1 + C_1R^3)/(1 - C_2R^3) \tag{12}$$

where $C_1$ and $C_2$ are numerical factors dependent on the microscopic physical and electrical gas properties and $R$ is the cluster radius.

The following table shows how the dielectric constant of the gas and therefore the facility with which it can be moved to the high intensity region of the non-uniform field increases concomitantly with the increasing size of the theoretical gas clusters.

TABLE III

| R Cluster Radius in Meters | Composite Fluid Dielectric Constant |
|---|---|
| $10^{-10}$ | 1.0005[1] |
| $3 \times 10^{-10}$ | 1.0080 |
| $6 \times 10^{-10}$ | 1.0660 |
| $9 \times 10^{-10}$ | 1.2360 |
| $1.5 \times 10^{-10}$ | 2.5300 |

1. Close to the accepted of room air.

In conjunction with the foregoing, I have found the relationships between the current density (J), the slip (S), the dielectric constant of the gas-particle mixture (K), and the theoretical cluster radius (R) to be generally the same for a wide range of geometric variables and efficiencies.

For example, concentric cylinder structure with outer and inner cylinders of 8 inches and 3 inches, 2 inches and seven-eighths inch, and three-fourths inch and one-fourth inch, respectively, all exhibited the following trends:

| S | J amps/cm$^2$ | | R |
|---|---|---|---|
| 0.7 to 0.9 | 7×10$^{-10}$ to 3.8×10$^{-9}$ | 1.3 to 2.3 | 9.6×10$^{-10}$ to 1.3×10$^{-9}$ |

These values were exhibited over a wide range of efficiency values and electric field intensities. The results point toward the fact that modest increases in R caused by the small current densities give rise to slip values (and corresponding values of K) which allow a substantial reduction in the drag between the particles and the fluid with the consequent improved collection efficiencies of the present novel process.

It is within the compass of my invention to collect the particles to be separated on a bare conductor or electrode disposed in the highest intensity region of the non-uniform field. However, the particles will in many cases tend to scatter from a bare electrode because a charge can be imparted to them as they migrate to and impinge on the electrode. The charged particles are then repelled from the electrode and scattered. Accordingly, for many applications, I prefer to surface the portion of the collecting electrode to which the particles migrate with a nonconductive material as it has been found that this materially increases the particle retaining capability of the collecting electrode or conductor.

The use of a non-conductive filter body of sintered glass particles to trap impurities in an electrostatic, Cottrell type device for cleaning oil has been proposed in U.S. Pat. No. 3,190,827 issued June 22, 1965, for APPARATUS FOR CLEANING LIQUIDS. However, there is no recognition in this patent of the combination of characteristics which a material must have to make it suitable for my purposes. More specifically, to be an effective collector or trap for the particles propelled to a collecting electrode in the type of device I have invented, the material must not only be non-conducting, but it must have a dielectric constant close to that of the gas in which the particles being separated are dispersed as the latter exists under the influence of the nonuniform field.[4a]

[4a] This readily distinguishes my invention from devices such as those disclosed in the above-cited Japanese Pat. Publication No. 293153 in which the collecting electrode is surrounded by a material having a much higher dielectric constant such as ebonite.

Also, a high degree of porosity is a characteristic of some useful materials. However, this is not essential is the material otherwise has surface or other adhesive characteristics which make it capable of retaining particles propelled against it.

Several materials have proven to be satisfactory for the purposes discussed above. These are porous ceramics, epoxy and urethane foams, fiberglass, glass cloth, coatings of alumina and other materials, and oil coatings.

A number of tests were run in which the inner electrode of a device as shown in FIG. 2 was coated with various materials. The results are summarized below:

TABLE IV

| Cross-Sectional Area of Flow Passage Between Inner & Outer Conductors ($b^2-a^2$) in Square Inches | Inner Electrode Cover | Relative Efficiency |
|---|---|---|
| | POLLUTANT: Talc | |
| Greater Than 75 Square Inches | None (Bare Electrode) | 0.92 |
| | Fiberglass Cloth | 1.00 |
| | POLLUTANT: A.C. Fine Test Dust[1] | |
| From 75 square Inches to 10 Square Inches | None (Bare Electrode) | 0.80 |
| | Fiberglass Cloth | 1.00 |
| | POLLUTANT: D1-2 Ethylhexy Phthalate (DOP) | |
| | None (Bare Electrode) | 0.86 |
| | Fiberglass | 0.89 |
| | Polyurethane Foam (97% Voids) | 0.97 |
| | Polyurethane Foam & Swirler[2] (97% Voids) | 1.00 |
| | POLLUTANT: A.C. Fine Test Dust[1] | |
| Less Than 10 Square Inches | None (Bare Electrode) | 0.92 |
| | Epoxy Foam with Silica Filler | 1.00 |
| | POLLUTANT: D1-2 Ethylhexyl Phthalate (DOP) | |
| Less Than 10 Square Inches | None (Bare Electrode) | 0.73 |

TABLE IV — Continued

| Cross-Sectional Area of Flow Passage Between Inner & Outer Conductors ($b^2-a^2$) in Square Inches | Inner Electrode Cover | Relative Efficiency |
| --- | --- | --- |
| | POLLUTANT: D1-2 Ethylhexy Phthalate (DOP) | |
| Less Than 10 Square Inches | None (Bare Electrode) | 0.73 |
| | Polyvinyl Chloride Foam | 0.78 |
| | Polyurethane Foam (97% Voids) | 1.00 |

1. A.C. Fine Test Dust is a commercially available dust supplied by the AC Spark Plug Division of the General Motors Corporation. The particle size distribution is:

| | |
| --- | --- |
| 0 to 5 microns | 39 ± 2% |
| 5 to 10 microns | 18 ± 3% |
| 10 to 20 microns | 16 ± 3% |
| 20 to 40 microns | 18 ± 3% |
| 40 to 80 microns | 9 ± 3% |

2. The "swirler" used in this series of tests was constructed from galvanized sheet metal in the form of stationary vanes and was used to deflect and rotate the gas stream and thereby create turbulence to make the separation process more efficient.

It will be apparent from the foregoing that significantly superior results were in each instance obtained by using a collector material having the characteristics described above. In contrast, materials such as Teflon, which is non-conducting and has a low dielectric constant, has been found not to be satisfactory as a collector material because it is not capable of retaining the particles impinging on it.

The tests in which the foregoing data were generated were conducted essentially in the manner hereinafter described in conjunction with Examples I–VI.

In conjunction with the foregoing, the advantages of employing a coating of non-conducting material having a low dielectric constant can in certain applications be obtained by employing a layer of the collected particles as a coating; that is, by allowing the particles of the separated material to build up and form a film or layer on the surface of the electrode.

As indicated above, separation systems in accord with the principles of the present invention may have a variety of physical configurations. One such system 20, illustrated in FIG. 3, includes among its major components a separation unit 22, a high voltage power supply 24, and a blower or other pump 26[5] for the gas from which the desired substance or substances are to be separated.

Figure 3:
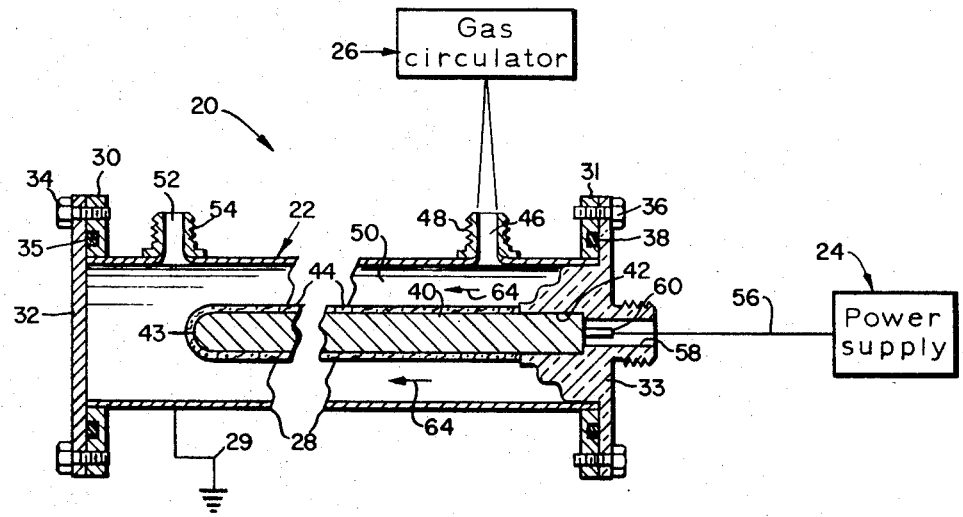
FIG. 3 is a view of one form of apparatus for separating solid and liquid particles from air and other gases in accord with the principles of the present invention, the separation unit of the apparatus being shown in section.

[5.] The term "pump" is intended to be used herein in an extremely broad sense. For example, the gases were supplied to one actual separation unit 22 as shown in FIG. 3 from a port in the stack of a petrochemical plant, the function of the separation unit being to remove particulates from the stack gases prior to entry into an oxygen analyzer incorporated in the control system of the plant. In this application, therefore, the pumping was by the natural draft in the stack.

Separation unit 22 includes an elongated, outer electrode 28 in the form of a vertical cylinder. This electrode is grounded through lead 29. Flanges 30 and 31 are fixed to the ends of electrode 28 as by welding.

The interior of outer electrode 28 is converted into a closed chamber by an end plate 32 and an insulator 33. End plate 32 is fixed to flange 30 as by fasteners 34. An O-ring 35 keeps gases in electrode 28 from leaking between flange 30 and end plate 32 to the exterior of separation unit 22.

Insulator 33 is similarly fixed to the flange 31 at the opposite of the end of the separation unit as by fasteners 36 with an O-ring 38 being employed to prevent leakage at this end of the separation unit.

A second, circularly sectioned, elongated, inner electrode 40 is supported concentrically within outer electrode 28 by insulator 33. The insulator has a recess 42 in which one end of electrode 40 is secured. As shown in FIG. 3, inner electrode 40 has a rounded end 43. This is to prevent corona discharge from the electrode.

In this embodiment of the invention, a non-uniform field is established between inner and outer electrodes 40 and 28 by energizing the inner electrode from power supply 24. The field lines converge on inner electrode 40. Accordingly, the inner electrode is preferably surrounded by a layer of filter material 44 to collect particles propelled to it by the non-uniform field as discussed above.

The gas from which particles are to be separated enters separation unit 22 through an inlet 46 in a fitting 48, flows through the annular passage 50 between the inner and outer electrodes, and is discharged from the unit through a passage 52 in outlet fitting 54.

Referring still to FIG. 3, power supply 24 may be of any conventional construction. The power supply is connected to inner electrode 40 by lead 56, which extends through aperture 58 in insulator 33 to an attachment plug 60. This plug is, in turn, connected to inner electrode 40.[5a]

[5a.] In this and other embodiments of the invention, the outer conductor can be connected to the power supply and the inner conductor grounded, if desired. However, the arrangement just described is preferred for safety reasons.

The remaining component of the system shown in FIG. 3; via., circulator 26, may be a blower or other gas pump. Or, as indicated above, the gas from which particles are to be separated may emanate from a source such as a stack, the exhaust system of an internal or external combustion engine, etc. Furthermore, it will be obvious to those knowledgeable in the relevant arts that the circulator can be employed on the exhaust rather than the supply side of unit 22 or that circulators can be used on both the supply and exhaust sides of the separation unit, if desired.

As indicated above, in the operation of system 20, high voltage power supply 24 is energized, establishing a high intensity, non-uniform electrical field between inner electrode 40 and outer electrode 28 of separation unit 22. Circulator 26 is then started, effecting a flow of the gas from which particles are to be separated through the annular passage 50 between electrodes 28 and 40 in the direction shown by arrows 64 in FIG. 3. As the gas flows through passage 50, the force resulting from the non-uniform field between the electrodes deflects the particles mixed with the gas along with the gas itself toward the region of the field where the field strength is highest, which is adjacent inner conductor 40. Here the particles are trapped by filter 44.

There are a number of critical factors and interrelationships between these factors which must be observed to make a separation unit 22 as just described operable.

First, I have found that, for all practical purposes, the minimum radius of curvature of the equipotential lines in the structure[6] must be at least 1 millimeter and that the ratio of the maximum radius of curvature of the equipotential lines[7] to the minimum radius of curvature thereof must be greater than 1 and less than 20 and should preferably be between 2 and 10 for efficient operation.

[6.] In separation unit 22, this is the radius of inner conductor 40.
[7.] In separation unit 22, this is the radius of outer conductor 28.

If the inner electrode is less than 1 millimeter in diameter, pressure drops through the separation unit become impractically high if the necessary relationship between the radii of the outer and inner conductors is observed. Furthermore, even small irregularities in the surfaces of smaller conductors can cause corona discharge. As discussed above, this is also undesirable.

Figure 29:
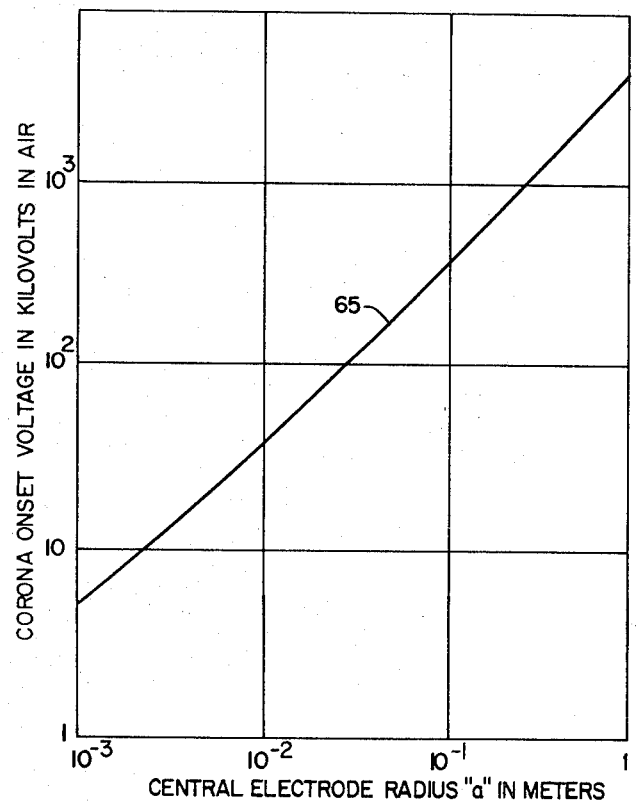
FIG. 29 is a plot of inner electrode diameter versus corona onset voltage for a device in accord with the principles of the present invention having the electrode configuration shown in FIG. 2.

In fact, present day equipment makes it impractical to employ voltages higher than $2.5 \times 10^5$ in operating devices of the type shown in FIG. 3. For voltages of this magnitude, the radius of the minimum conductor must be at least 10 millimeters as will be evident from curve 65 in FIG. 29.

I have also found that the gradient of the electrical field squared in the non-uniform field (G) should be maintained as high as possible because the force available to propel the particles being separated to inner electrode 40 is proportional to G. The formula for $G_{max}$ for a unit of the configuration shown in FIG. 3 is:

$$G_{max} = 2 \left| E^2 max \right| / a \quad (13)$$

Where $E$ is the breakdown strength of the gas in which the particles are dispersed and $a$ is the radius of inner electrode 40. For air at atmospheric pressure, $E_{max}$ cannot exceed about 30 kV/cm without the onset of corona discharge; and the minimum radius "$a$" cannot be less than 1 millimeter for the reasons discussed above. From this one would expect that the gradient of the electric field squared could be as high as 18,000 kV²/cm³ in separation units of the configuration shown in FIG. 3. However, I have found that G values of this magnitude cannot even remotely be approached in actual practice because corona onset will occur if the voltage across the electrodes is increased significantly above 10 kV. Accordingly, theoretical considerations to the contrary, G values must be limited to about 2,000 kV²/cm³ for devices embodying the principles described herein to operate properly.

The force $F$ propelling the particles to the high intensity region of the non-uniform field is proportional to the gradient of the electric field squared; i.e., $$F \propto G \propto |E|^2 / a \quad (14)$$

Nevertheless, collection efficiencies approaching 100 percent are consistently obtained even though only low G values can be employed so that only small forces $F$ can be developed. It is believed that these high collection efficiencies are attributable to my novel technique of reducing the drag forces on the particles by concomitantly moving to the region of the non-uniform field in which the field intensity is the highest both the particles and the gas in which they are dispersed.

For this reason, it is essential that there be a small flow of current between inner and outer electrodes 40 and 28 in the operation of separation unit 22 as well as those discussed hereinafter. For the reasons discussed in detail above, this must be such that the maximum density of the current in the non-uniform field between the inner and outer conductors will be between $10^{-12}$ and $10^{-6}$ ampere per centimeter squared. This is brought about by relating the voltage applied to inner conductor 40 to the radii of the inner and outer conductors, typically as described in the accompanying examples.[8]

[8.] For any given application of the invention, an appropriate current can be readily obtained as it is a function of the applied voltage, the specific geometry of the electrodes, and the electrical properties of the gas particle mixture flowing through the separation unit. For example, for separation units having the electrode configuration shown in FIG. 3, the equation is $$V = C \ln(\sqrt{C^2 + 2Ia^2/u} + C/\sqrt{C^2 + 2Ib^2/u} + C)$$

where $C$ is a geometry related constant, $\mu$ is the ionic mobility, $a$ and $b$ are as shown in FIG. 2, and $V$ and $I$ are the voltage across and current flowing between the electrodes. For other geometries, comparable equations can be derived or empirically obtained.

As will be apparent from the foregoing, there are a number of important differences between the novel devices I have invented and those employing non-uniform fields in the manner heretofore proposed in configuration, in capability, and in the operating factors, which must be observed. A number of these differences are highlighted in the following table.

TABLE V

| | PRESENT INVENTION | | PRIOR ART DEVICE[8a] | |
|---|---|---|---|---|
| Minimum Particle Size Collectable at a Practical Rate | sub-micron | | 10 to 100 microns | |
| | Maximum | Minimum | Maximum | Minimum |
| Inner Electrode Radius | Unlimited | 1–10 mm | 2.5 mm | 0.1 mm |
| Ratio of Outer Electrode Radius to Inner Electrode Radius | 20 | 1.5 | 50 | 4 |
| $G_{max}$ (kV²/cm³) | 2000[1] | 10² | 3·10⁶ | 35,000 |
| $E_{max}$ (kV/cm) | 30[1] | — | | |
| Current Density Between Electrodes (amps/cm²) | 10⁻⁶ | 10⁻¹² | Ideally Zero | — |

[1.] In air
[8a.] As shown in the above-cited U.S. Patent No. 3,304,251, for example.

For the sake of convenience, much of the foregoing discussion has been related to devices of the present invention having the electrode configuration shown in FIG. 3. It is to be understood, however, that the criteria discussed above are in many cases also applicable to the other electrode configurations which the devices of the present invention may have although numerical values may differ as will be discussed hereinafter.

Figure 4:
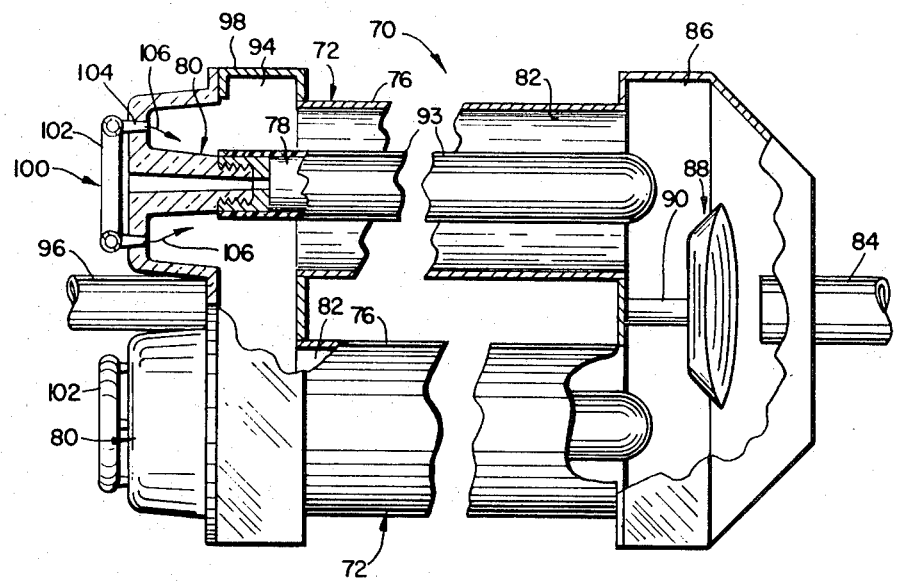
FIG. 4 is a side view of a second form of separation unit embodying the principles of the invention, part of the external housing of the unit being broken away to show its internal construction.

Referring again to the drawing, FIG. 4 depicts separation apparatus 70 which, essentially, consists of a plurality of units of the type illustrated in FIG. 3. Separation units of this character may be employed for applications requiring increased capacity or for other reasons.

Separation apparatus 70 includes four identical separation units 72, each having a cylindrical outer electrode 76 and an inner electrode 78 end-supported in concentric relationship within the outer electrode by an insulator 80. This arrangement provides annular flow passages 82 between the inner and outer electrodes in each of the four separation units 72.

The gas from which particles are to be separated is supplied to separation units 72 from an inlet conduit 84 through a plenum 86 which is fixed to the outer electrodes 76 of the separation units at one end thereof. A baffle or distributor 88 is preferably mounted in plenum 86 opposite supply conduit 84 by a strut 90 to distribute the gas equally between the separation units 72 and to impart turbulence to the gases as they enter the separation units to improve the particle collection efficiency. From plenum 86 and baffle or distributor 88, the gas and the particles dispersed therein flow into and through the passages 82 of separation units 72.

In this embodiment of the invention, as in that illustrated in FIG. 3, the inner electrodes are energized to provide between the inner and outer electrodes of the separation units non-uniform electrical fields which converge at the inner electrodes. Accordingly, as the gas flows through the separation units, the particles dispersed in it are propelled to the inner electrodes 78, where the particles are separated and trapped on filter members 93 surrounding the inner electrodes of the two separation units in the same manner as in the embodiment of FIG. 3.

The gas then flows from passages 82 into an exit or discharge plenum 94 and, from the latter, into a discharge conduit 96. The structure 98 forming discharge plenum 94, which can be fabricated of sheet metal or the like, is fixed to the outer electrodes 76 of separation units 72. This structure also provides a support for the insulators 80 of the separation units as shown in FIG. 4.

From the foregoing, it will be apparent that the separation units 72 of apparatus 70 operate in essentially the same fashion as the separation unit 22 described above. It has been observed, in this regard, that the collection efficiencies of devices as shown in FIGS. 3 and 4 tend to decrease during extended periods of operation due to the collection of pollutants on the insulators from which the inner electrodes are supported. To prevent this from occurring, an insulator cleaning system 100 is employed in the embodiment of the invention shown in FIG. 4.

More specifically, purge air is supplied under pressure from a suitable source (not shown) through conduits identified generally by reference character 102 in FIG. 4 to nozzles 104 extending through the insulators 80. From nozzles 104, the purge air flows over the inner surfaces of the insulators as shown by arrows 106 in FIG. 4 to keep material from collecting on them.

Figure 7:
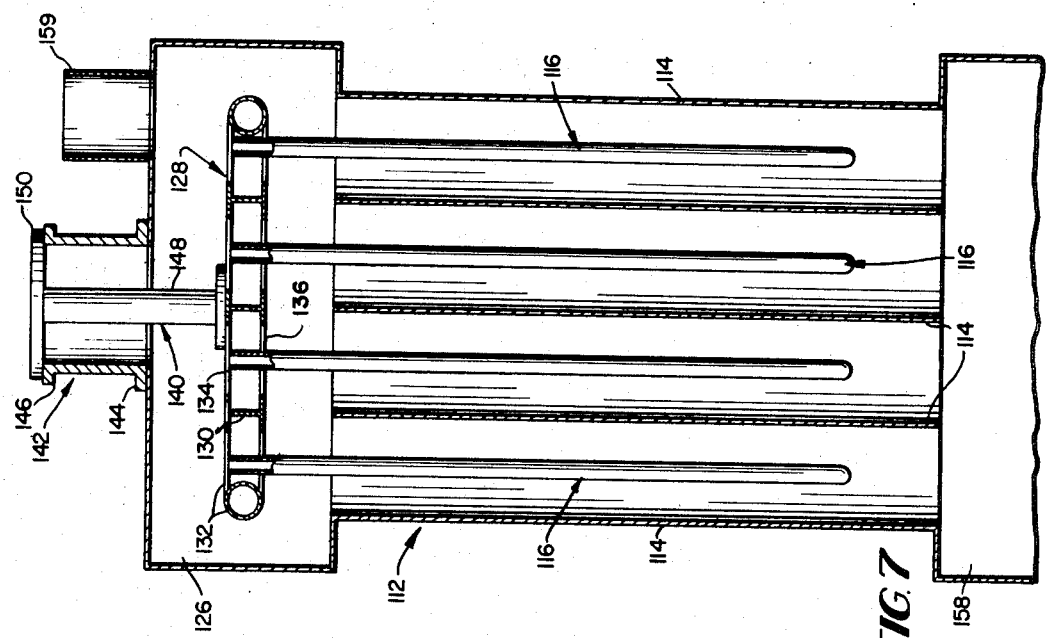
FIG. 7 is a vertical section through one of a plurality of integral separation units incorporated in the apparatus of FIG. 6.

FIGS. 6 and 7 show a still larger capacity system 110 for separating particles from gases in accord with the principles of the present invention. This installation would be used, as an example, to remove pollutants from stack gases generated in an industrial manufacturing operation.

This embodiment of the invention employs a battery of separation units 112 essentially similar to those discussed above in conjunction with the separation unit 22 of FIG. 3. Each of these separation units includes a cylindrical outer electrode 114 and an elongated inner electrode 116 surrounded by a filter or trap 118, again having the characteristics described above.

As shown best in FIG. 6, the outer, cylindrical electrodes 114 are mounted generally between a casing 120 providing an inlet plenum 122 and a casing or housing 124 providing an outlet or exhaust plenum 126.

Inner electrodes 116 are supported by groups in concentric relationship in outer electrodes 114 by hanger assemblies 128, the details of which are not important in the practice of the present invention. Briefly, however, as shown in FIG. 7, they consist of a network of I-beams 130 supported within a peripheral frame composed of tubular members 132.

The electrodes 116 are supported at their upper ends from the associated hanger assembly 128 by upper and lower support members 134 and 136 which may be fixed as by welding to the hanger assembly and to the electrodes with which they are associated.

Each of the hanger assemblies 128 is supported from the top wall 138 of casing structure 124 by an arrangement including a support 140 for the hanger assembly and an insulator 142. More specifically, as best shown in FIG. 6, insulators 142 are generally cylindrical members having a lower flange 144, which is fixed to wall 138, and an upper flange 146. The hanger supports 140 include a post 148 with a disclike member 150 attached to the upper end thereof. As assembled, the posts 143 of supports 140 extend upward through insulators 142, supporting discs 150 resting on the upper flanges 146 of the insulators and being attached thereto as by threaded fasteners.

The operation of the separation units 112 in the installation 110 shown in FIG. 7 is virtually indentical to that of the separation devices described previously. The inner electrodes 116 are energized to create between them and outer electrodes 114, non-uniform fields which converge toward the inner electrodes.

The gas from which particles are to be separated flows through an intake duct 152 into the upper portion 154 of inlet plenum 122 and then downwardly through an intermediate part 156 of the plenum into its lower section 158. From here the gas travels upwardly through separation units 112, where the particles are propelled to the inner electrodes 116 by the non-uniform fields in the units in the manner described previously and trapped on filters 118.

The gas then flows into exhaust plenum 126 and, from the latter, into exhaust conduits 159.

In this embodiment of the invention, the collected material is periodically removed from filters 118 by conventional cleaning devices 160 of the vibrator type, which are mounted on the top wall of the structure 124 providing plenum 126 (only one such vibrator is shown in FIG. 6). A number of suitable vibrating units are commercially available. One such is the Model V85 Syntron Bin Vibrator.

The collected material vibrated loose from filters 118 falls into hoppers 162 at the lower end of the unit from which it may be removed and disposed of in any convenient fashion.

One application for which separation devices in accord with the principles of the present invention are especially well suited is the removal of particles from stack gases emanating from a manufacturing process, incinerator, etc. In many cases, the stack itself will have a conductive inner surface because of an accumulation of carbon or other conductive particles.

Figure 5:
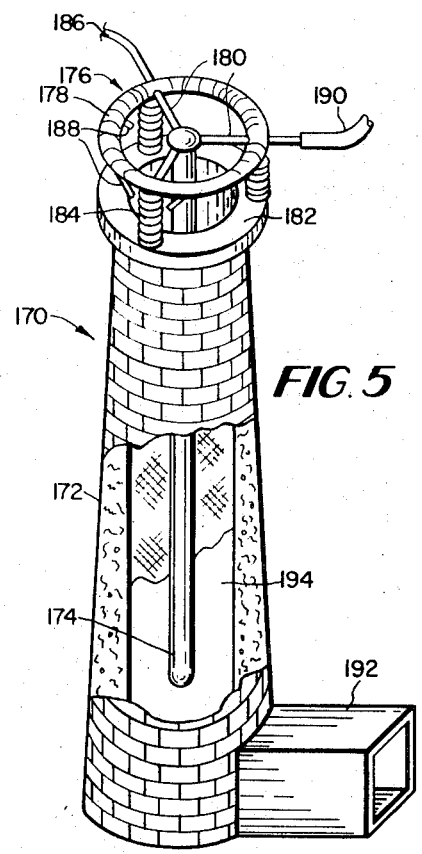
FIG. 5 is a pictorial view of a stack equipped with apparatus for separating particulate solids from gases flowing therethrough in accord with the principles of the present invention.

In these circumstances, the stack itself can be employed as one of the two electrodes as in the installation 170 illustrated in FIG. 5. In this installation, stack 172 serves as the outer electrode for a separation unit of the type employed in the already discussed embodiments of the invention. The inner electrode 174, again of the type and configuration discussed above, is supported within stack 172 by a hanger assembly 176.

The hanger assembly includes an upper support 178 from which the electrode is supported by radial members 180 and a lower support member 182 which rests on the upper end of stack 172 and supports upper member 178 through insulators 184. A conductor 186 extending through one of the radial brackets 180 supplies power to inner electrode 174 to establish a non-uniform field between it and stack 172.

Also, as in the embodiments of the invention described previously, purge air may be supplied to keep particles from collecting on insulators 184 and causing a deterioration in the efficiency of the separation unit. In this event, upper support 178 will typically be a hollow tubular member and nozzles 188, communicating with the interior of member 178, will be directed toward the insulators. Accordingly, purge air supplied through conduit 190 will flow from the conduit into support 178 and through the latter and nozzles 188 across insulators 184 to prevent the unwanted accumulation of material on them.

Again, the operation of this embodiment of the invention is essentially the same as that of the embodiments described earlier. The gas from which particles are to be separated flows through inlet duct 192 into the lower end of stack 172 and then upwardly through the stack in the annular passage 194 between the stack and inner electrode 174. As the gas rises, the particles dispersed in it migrate to inner collector 174 under the influence of the non-uniform field and are trapped on a filter of the type described above (not shown). At the upper end of the stack, the cleaned gas exits from the stack.

It is of course not essential that the coating consist of accumulated carbon in applications of the invention such as that just described. Conductive coatings may instead be applied to an electrode or electrodes by any of the numerous available techniques.

Figure 8:
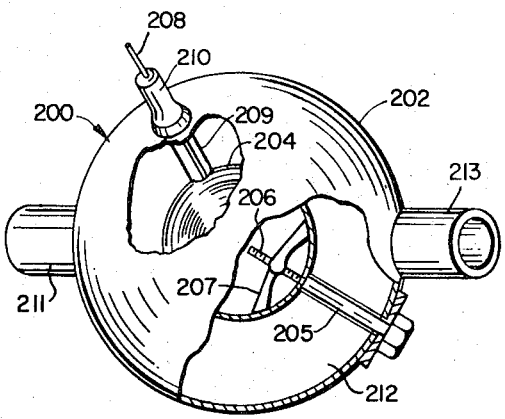
FIG. 8 is a pictorial view of a spherical electrode separation unit constructed in accord with the principles of the present invention.

As implied previously, separation units in accord with the present invention are not limited to the concentric electrode arrangement employed in the embodiments of the invention so far described. For example, FIG. 8 illustrates a separation unit 200 having a spherical outer conductor 202 and a concentric spherical inner conductor 204. Inner electrode 204 may be supported from the outer electrode in any convenient fashion. As shown in FIG. 8, the support arrangement includes a cylindrical insulator 205. The insulator and inner electrode are kept in place by bolt 206 which extends through the outer and inner electrodes and is threaded into toggle type fastener 207.

As in the embodiments of the invention described above, the outer electrode 202 of separation unit 200 is grounded. Inner electrode 204 is connected to an appropriate power supply (not shown) by a conductor 208 extending through insulator 209 and high voltage bushing 210 to the exterior of the separation unit. This creates a non-uniform field which converges to inner electrode 204.

In this embodiment of the invention, the gas from which particles are to be separated flows from inlet conduit 211 through a passage 212 between the inner and outer electrodes and then through exhaust or outlet conduit 213. As the gas flows through passage 212, the particles dispersed in the gas are propelled to the surface of inner electrode 204 which may be covered by a material of the type discussed previously to trap the particles.

One of the advantages of the spherical electrode configuration illustrated in FIG. 8 is that, all other factors being equal, the force available to propel particles to the high intensity region of the field is approximately double that available in the cylindrical electrode configuration described above. More specifically, as mentioned previously, this force is proportional to the gradient of the non-uniform field squared. As was also mentioned earlier, the maximum of the gradient of $|E|^2$ (designated "$G_{max}$") is equal to $2|E^2|/a$ in the cylindrical configuration. In the spherical arrangement, on the other hand, it is equal to $4|E^2|/a$. Accordingly, for the same field, twice the particle propelling force can be developed.

Variations of the basic spherical geometry and a combination of spherical units can be employed. For example, a basic cylindrical geometry as discussed above having an inner electrode with spherical end caps or a prolate spheroidal geometry may be particularly advantageous for specific applications of the invention.

Figure 17:
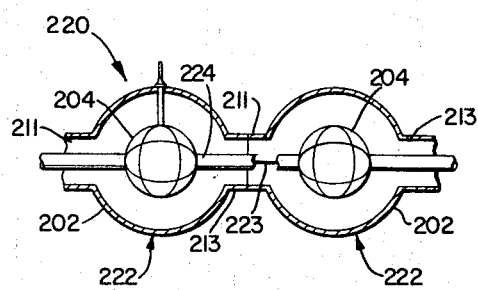
FIG. 17 is a generally diagrammatic section through apparatus in accord with the present invention showing how separation units as disclosed herein can be connected in series.

A system employing multiple units of the type illustrated in FIG. 8 is shown in FIG. 17 and identified by reference character 220. System 220 consists essentially of two spherical units 222 of the type described above with the outlet conduit 213 of the first unit connected to the inlet conduit 211 of the second unit. In this system, the inner electrode 204 of the second unit is energized through a conductor 223 which is disposed in a hollow insulator 224 connected between the two inner electrodes.

Figure 9:
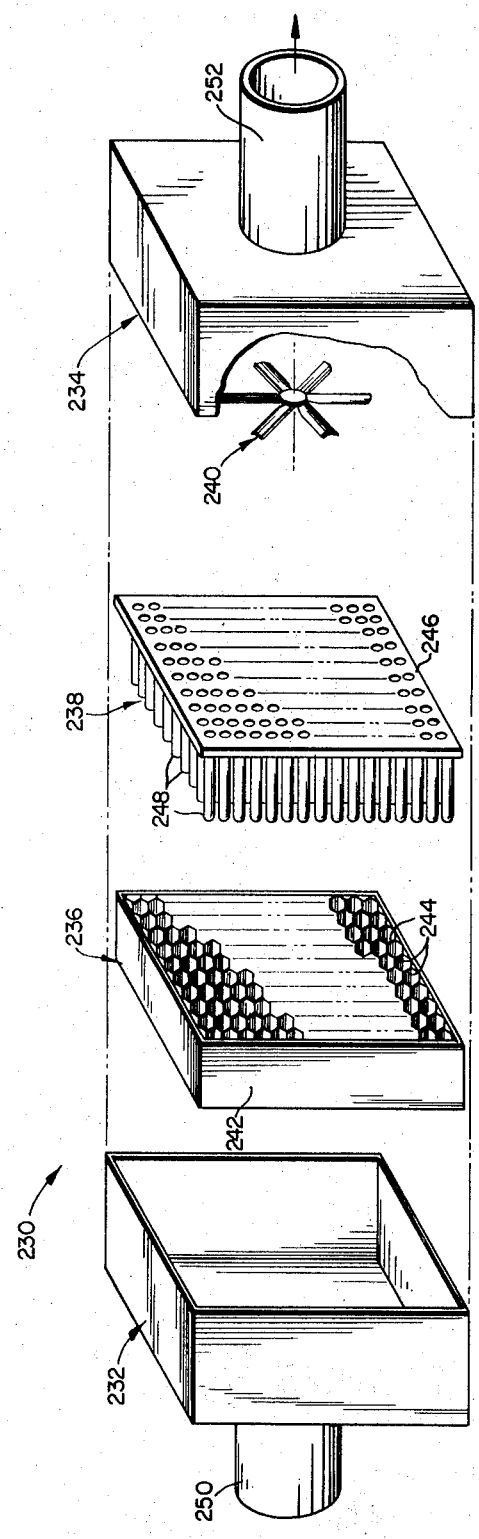
FIG. 9 is an exploded view of a multi-cellular type separation unit embodying the principles of the present invention.

It is not necessary that the electrodes have a circular configuration or even a curved configuration to make them useful for my purposes. For example, FIG. 9 depicts a separation unit 230 in accord with the present invention which has a number of separation elements each having a cylindrical inner electrode and a hexagonally configured outer electrode or cell. The major components of separation unit 230 are end jackets 232 and 234, electrode units 236 and 238, and a blower 240. Electrode unit 236 consists of a frame 242 housing an assemblage of hollow, hexagonally sectioned cells 244. This unit may be fabricated in the form of a one-piece molding from a conductive metal or plastic or from a non-conducting plastic coated with an appropriate conducting material, for example.

Companion electrode unit 238 includes a base 246 to which rodlike electrodes 248 are fixed in any array corresponding to that of the hexagonal cells 244 in electrode unit 242. As an example, the base 246 of this unit may be fabricated from plexiglass covered with aluminum foil to provide a bus sheet for electrodes 248.

Unit 230 is assembled with electrode units 236 and 238 abutting so that electrodes 248 are disposed within hexagonal electrode cells 244. This assemblage is mounted within the boxlike end jackets 232 and 234. Electrode unit 236 is grounded and unit 238 connected to an appropriate power supply (not shown). This creates within each of the cells 244 a non-uniform field which converges toward the cooperating inner electrode 248.

The operation of this unit is again much the same as described above. Blower 240 draws the gases from which particles are to be separated through the unit, the gases flowing from inlet 250 in parallel through cells 244 and finally through discharge or outlet conduit 252. As the field lines converge to the inner electrodes 248, the particles dispersed in the gas are propelled to the inner electrodes, where they may be collected.

It is, of course, not necessary that cells 244 have a hexagonal configuration. They can be circular, square, or of any other desired configuration capable of producing a non-uniform field in association with electrodes 248.

Devices of the type shown in FIG. 9 are particularly useful for providing clean air in enclosed areas. These include rooms of residences and hospitals, areas in which manufacturing operations are carried out, etc.

Figure 11:
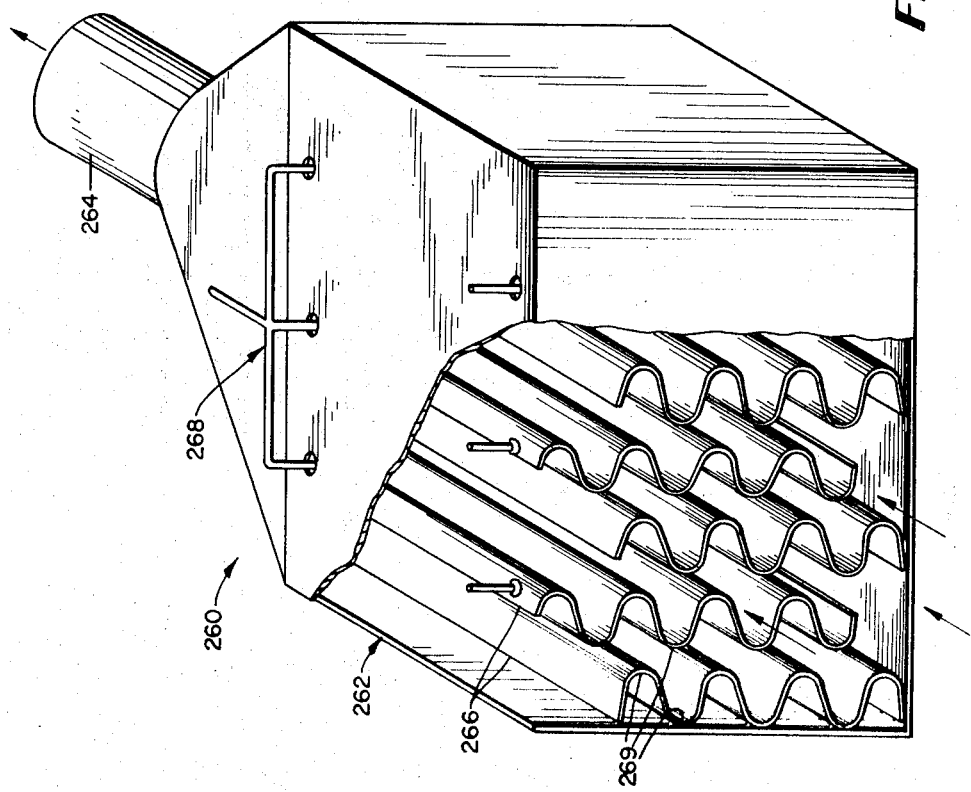
FIG. 11 is a view similar to FIG. 10 of an embodiment of the invention which employs wavy plate electrodes.

FIG. 11 depicts another separation device 260 embodying the principles of the present invention which further illustrates the wide variety in appearance that separation units in accord with the principles of the present invention may have. This unit includes a housing 262 provided with an inlet (not shown) and an outlet 264. As the gas from which particles are to be separated flows through housing 262, it traverses non-uniform electrical fields formed between electrodes 266 in the form of wavy plates supported in housing 262 in parallel, spaced apart relationship. In this arrangement, the non-uniform fields are established by grounding alternate ones of the electrodes 266 and connecting the remaining electrodes to an appropriate power source (not shown) through leads identified generally by reference character 268. These fields converge toward the regions identified by reference character 269.

Figure 15:
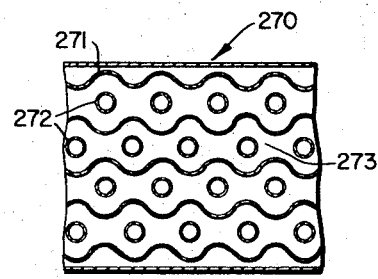

A variation of the electrode or conductor configuration of FIG. 11 is shown in FIG. 15. In the separation unit 270 illustrated in this Figure, conductors 271 of the wavy plate type are alternated with rows of circularly sectioned, rodlike conductors 272. Conductors 272 will typically be energized and conductors 271 grounded, creating non-uniform electrical fields which converge to conductors 272. Gases flowing through the passages 273 between conductors 271 around conductors 272 are accordingly propelled toward conductors 272 where they can be trapped and collected.

Figure 13:
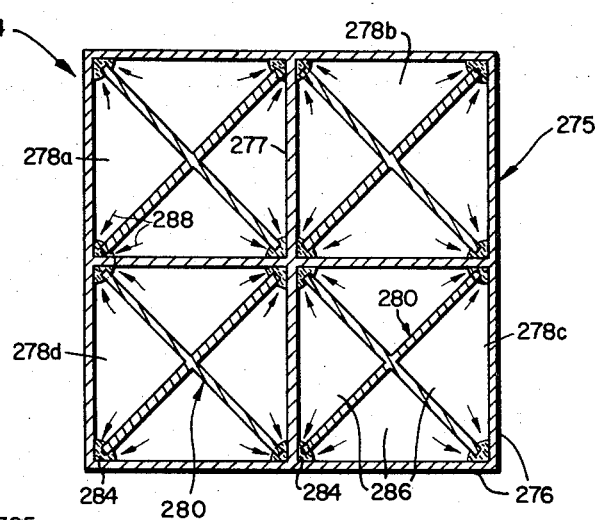

Non-uniform electrical fields useful for the purpose of the present invention can be established between flat as opposed to curved electrodes. FIG. 13 shows in cross-section a multicell separation unit 274 of this type. Unit 274 is generally similar to those described above as far as the overall arrangement is concerned. In unit 274, however, the hollow outer conductors 275 have a rectangular configuration. They are defined by outer wall members 276 and inner partitions 277, which, in the illustrated arrangement, provide four separation cells 278 a-d.

Disposed in each cell 278 is an X-shaped inner electrode 280. Supports 284 of insulating material electrically isolate the inner electrodes 280 from electrode members 276 and 277 and physically position them with respect to the latter.

The electrodes defined by wall members 276 and 277 are grounded, and the X-shaped electrodes 280 are connected by appropriate leads to a suitable power supply (not shown). Accordingly, when the power supply is energized, a high intensity, non-uniform field is established across each of the multiple flow passages 286 defined by the X-shaped electrodes 280 and conductive wall members 276 and 277. These fields converge to the corners of the flow passages as indicated by arrows 288 in FIG. 13.

Gases flowing through apparatus 274 in passages 286 traverse the electrical fields spanning the passages, and particles dispersed in the gas are accordingly propelled to the regions where the field lines converge. Here, they may be collected, again in the manner previously discussed. The gas in which the particles were dispersed is then removed from the unit through a suitable offtake (not shown).

Where the non-uniform field is established between flat as opposed to curved conductors, the minimum radius of curvature of the field lines spanning the first and second conductors must be at least 1 millimeter; and the ratio of the maximum to the minimum radius of curvature of any two field lines must be greater than 1 and less than 20 and should preferably be between 2 and 10 for efficient operation.

Figure 12:
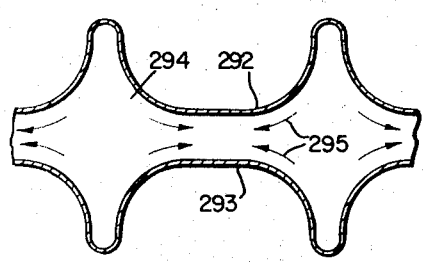
FIGS. 12–16 are sections through separation units in accord with the present invention having still different electrode configurations.

Electrodes having a combination of curved and flat surfaces can also be employed pursuant to my invention. For example, a non-uniform field useful for my purposes can be established between two electrodes 292 and 293 having the configuration shown in FIG. 12 by connecting one of the electrodes to an appropriate power source and grounding the other.

In a separation unit employing electrodes of this configuration, the gas from which the particles is to be separated would flow through the passages 294 between the electrodes in a direction normal to the plane of the figure. The field converges to the regions indicated by arrow 295; and the particles dispersed in the gas are accordingly moved to those regions. Here, they can be collected on an appropriate collector (not shown) of any of the various types discussed above.

Figure 16:
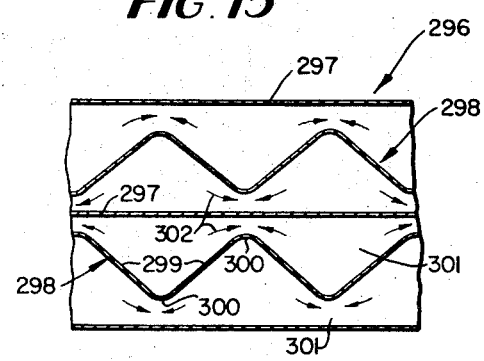
Figure 18:
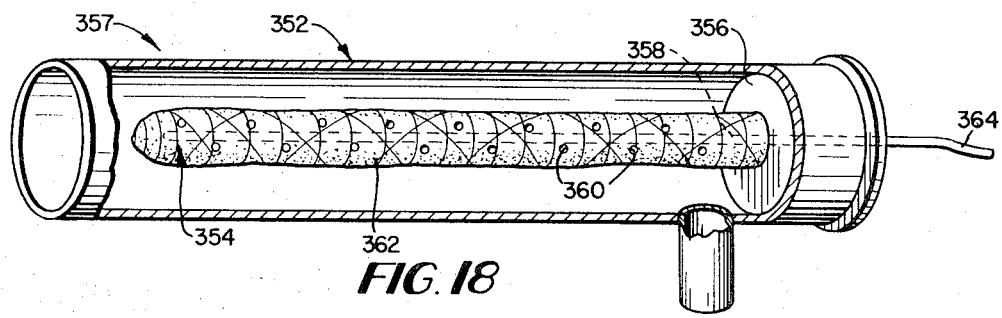
FIG. 18 is a pictorial, generally diagrammatic view of a separation unit in accord with the present invention equipped with a cleaning device for removing from the separation unit material collected by it.

FIG. 16 illustrates a separation unit 296 in which flat plate electrodes or conductors 297 are alternated with electrodes 298 having flat segments 299 connected by curved segments 300.

In a separation unit employing electrodes of the configuration illustrated in FIG. 16, the gas from which the particles to be separated can flow through the passages 301 between the electrodes in a direction either normal or parallel to the plane of the Figure. The field converges to the regions indicated by arrows 302; and the particles dispersed in the gas are accordingly moved to those regions. Here, they can be collected on an appropriate collector (not shown) of any of the various types discussed above.

Figure 14:
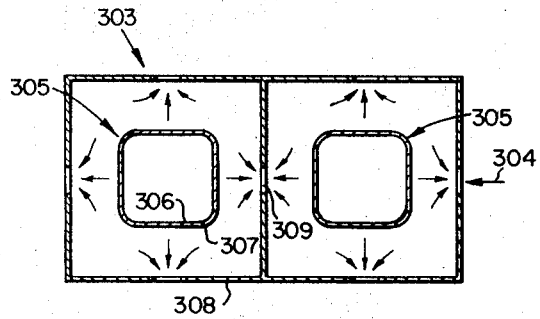

Another separation device employing hybrid curved-flat electrodes is illustrated in FIG. 14 and identified by reference character 303. In this embodiment, the gas from which the particles are to be separated can again flow through unit 303 in the direction indicated by arrow 304 or in a direction normal to the plane of the Figure.

Non-uniform fields are established by connecting inner electrodes 305 having flat portions 306 connected by curved segments 307 to a power source and grounding the rectangular external casing 308 of the unit, which will be made of conducting material to serve as the outer electrode. The fields converge to the regions identified by reference characters 309, where the particles dispersed in the gas can be collected.

From the foregoing, it will be apparent to those conversant with the relevant arts that the illustrated embodiments are only indicative of the wide variety of electrode configurations which may be employed for the purposes disclosed herein. Accordingly, the foregoing discussion is intended only to illustrate and not limit the scope of the invention.

In the embodiments of the invention described previously, with the exception of that shown in FIG. 14, the non-uniform electrical field is established between two imperforate electrodes which also define a flow passage through which the gas flows. This is by no means essential, however; and units in accord with the present invention may equally well be arranged so that the gas from which particles are to be separated flows through the electrodes providing the non-uniform field.

Figure 10:
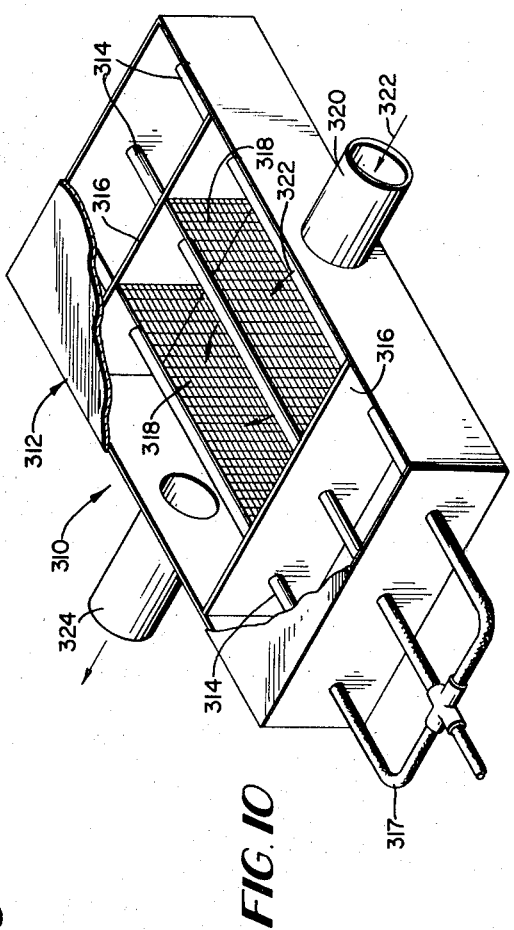
FIG. 10 is a pictorial view of a separation unit in accord with the principles of the present invention which employs grid-type electrodes, part of the external casing of the unit being broken away to show its internal components.

One such arrangement is illustrated in FIG. 10 and identified by reference character 310. This unit includes an external housing or casing 312 in which rodlike electrodes 314 similar to those described previously are supported in parallel, spaced apart relationship as by intermediate structural members 316. These electrodes are connected to an appropriate power supply (not shown) by leads identified generally by reference character 317.

Alternated with electrodes 314 in casing 312 are electrodes 318, which are perforate, gridlike structures having a plurality of openings or passages through which a gas can pass. These electrodes are grounded through appropriate leads (not shown). In this case, the field lines converge at the cylindrical, rodlike conductors 314.

In unit 310, the gas from which particles are to be separated is supplied through inlet conduit 320 and flows through the unit in the direction indicated by arrows 322, alternately flowing over rodlike electrodes 314 and through the gridlike electrodes 318. Accordingly, the particles dispersed in the gas are propelled under the influence of the non-uniform fields to the electrodes 314, where they can be collected, again by employing any of the several techniques disclosed earlier. The gas is then discharged from the unit through exhaust conduit 324.

Figure 26:
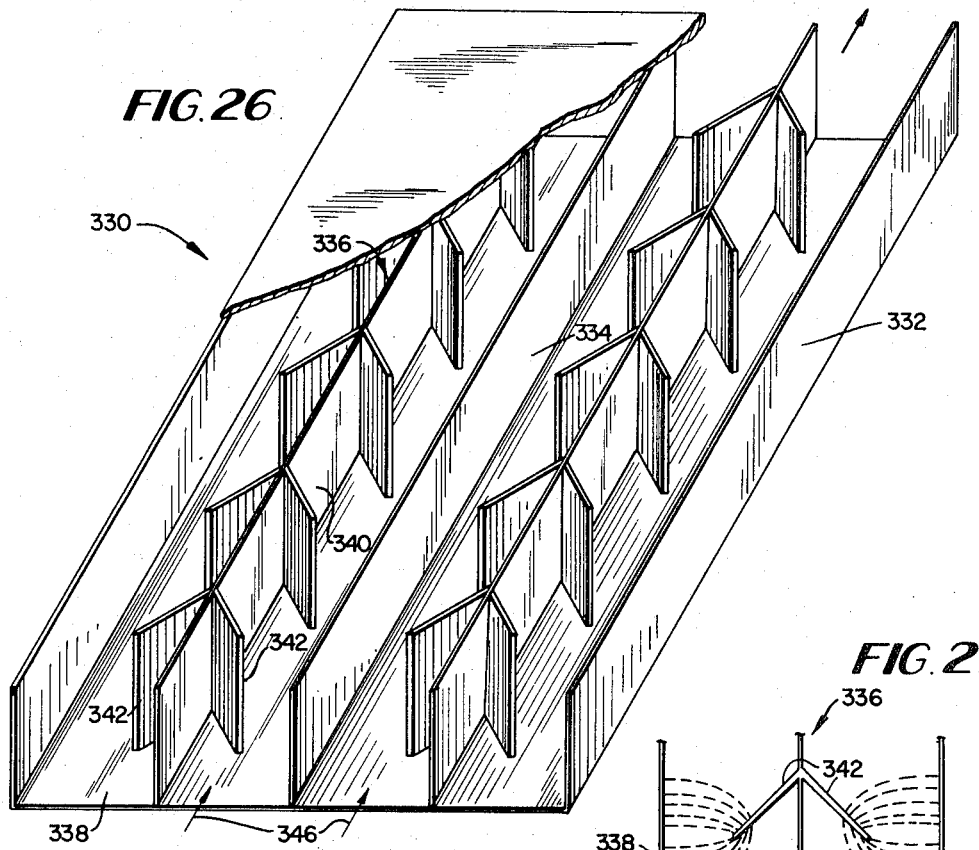
FIG. 26 is a pictorial view of a device in accord with the principles of the present invention in which a non-uniform field having its high intensity region between cooperating electrodes is generated.
Figure 27:
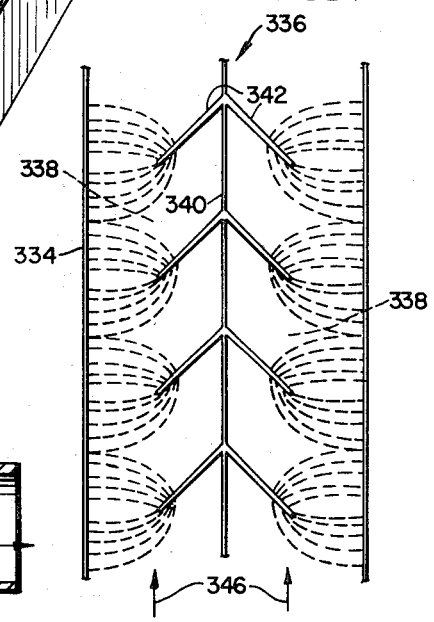
FIG. 27 is a partial longitudinal section through the device of FIG. 26.

In the embodiments of the invention so far described, the electrical field lines converge toward and terminate at an electrode. This is by no means essential, however. For example, FIGS. 26 and 27 show a separation unit 330 in accord with the principles of the present invention in which the field lines converge toward and the high intensity region of the field is accordingly between the electrodes.

More specifically, separation unit 330 includes a diagrammatically illustrated casing 332 housing platelike electrodes 334 and fishbonelike electrodes 336 disposed in parallel, spaced apart relationship with the two types of electrodes alternated to provide flow passages 338 therebetween.

Platelike electrodes 334, which may be fabricated of any conducting material, are grounded. The electrodes 336 alternated therewith have ribs 340 of conductive material to which fins 342 fabricated of a dielectric material such as polyvinylchloride are attached. Electrodes 336 are energized by connecting ribs 340 to an appropriate power source (not shown).

In this arrangement, non-uniform fields are established between electrodes 334 and 336 with the field lines converging at the tips of the dielectric fins 342. The gas from which particles are to be separated is introduced into the separation unit in the direction indicated by arrows 346 for flow through passages 338. Accordingly, the particles dispersed in the gas are propelled to the tips of the dielectric fins where they can be collected.

Certain of the mathematical relationships relevant to various ones of the embodiments of the invention described above have been discussed previously. These relationships along with those for other embodiments of the invention not expressly described above are shown in more detail in FIGS. 30a and 30b in which "$\wedge$" identifies a unit vector.

Numerous methods may be employed to remove collected materials from separation units in accord with the principles of the present invention. For example, if a filter or trap is employed, it may simply be removed from the unit periodically, cleaned or thrown away, and replaced. Alternatively, conventional vibrating type cleaners may be employed for this purpose as discussed above in conjunction with the embodiment of the invention illustrated in FIGS. 6 and 7.

Additional devices for removing collected materials are shown in FIGS. 18–24. For the sake of convenience, a separation unit having a cylindrical configuration as described earlier herein is depicted in each of these figures. However, it will be obvious to those skilled in the relevant arts that many of the illustrated cleaning devices are equally applicable to separation units of other configurations.

As illustrated in the Figures just mentioned, the separation unit has an outer electrode 352 and an inner electrode 354 supported from the outer electrode at one end thereof by insulator 356. The inner electrode 354 of the separation unit 357 shown in FIG. 18 has an internal flow passage 358. Communicating with this passage are radially extending passages 360 which open onto the exterior of the electrode. The electrode is surrounded by a covering 362 of a semiflexible material such as a thin wall metal, rubber, fiberglass cloth, or the like.

In operation, pulsating air is supplied under pressure from a suitable source (not shown) through lines 364 to passages 358 and 360 in the inner collecting electrode. The air pulses, causing the outer cover on the electrode to flex or vibrate, thereby breaking loose from the cover the collected material adhered to it. This material can then be discharged into a suitable collector (not shown).

Figure 19:
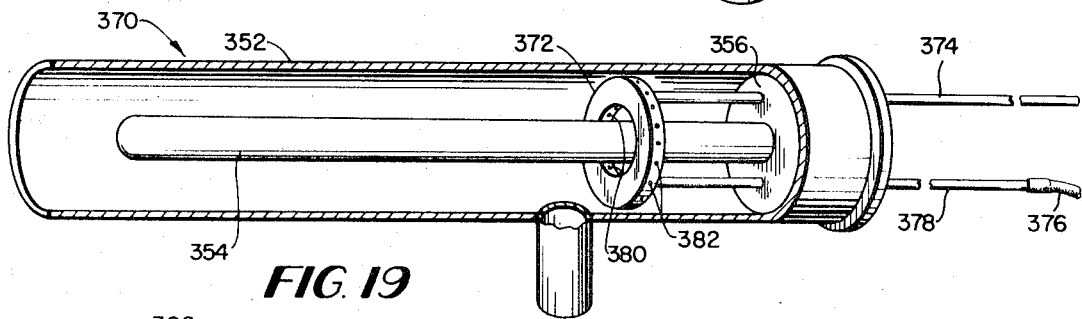
FIGS. 19–24 are views similar to FIG. 18 showing alternate forms of cleaning devices.

In the separation unit 370 illustrated in FIG. 19, the cleaning arrangement includes a hollow, toroidal member 372 which surrounds the inner, collecting electrode 354 and is supported from insulator 356 by pushrods 374 (only one of which is shown). The push rods are slidably mounted in the insulator so that the toroidal member 372 can be moved relative to electrode 354.

In operation, high pressure air is supplied through line 376 and conduit 378 to toroidal member 372. From this member, the pressurized air is directed through jets 380 against electrode 354 to break loose from the electrode the material collected on it, the members being moved along the electrode as the cleaning progresses. As in the embodiment of the invention shown in FIG. 18, the dislodged material can be discharged into a suitable collector.

Also, a second series of jets 382 can be provided on the outer periphery of toroidal member 372, if desired. Air blowing through these jets will impinge on the inner surface of outer electrode 352 to dislodge from it any material which may have scattered away from the inner electrode 354 and adhered to the outer electrode.

Figure 20:
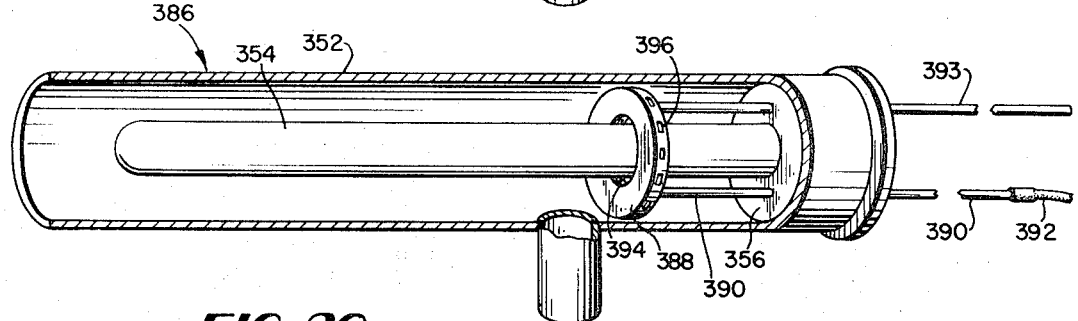

The cleaning device of the separation unit 386 illustrated in FIG. 20 is similar to that just described except that toroidal member 388 is connected through conduit 390 and line 392 to a vacuum source. Accordingly, as the toroidal member 388 is moved along inner electrode 354 by pushrod 393, material collected on the inner electrode (or both electrodes) is induced into the toroid through apertures 394 and 396 and flows through conduit 390 and line 392 to an appropriate collector (in this regard, the particles separated from the gas flowing through the separation unit agglomerate on the electrodes and accordingly become of a sufficient size that they can be effectively removed by a vacuum cleaning type arrangement).

Figure 21:
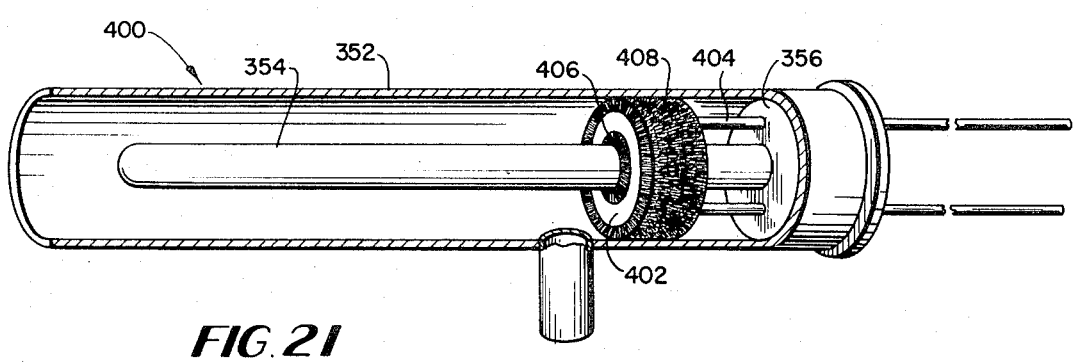

The cleaning device in the separation unit 400 illustrated in FIG. 21 includes a support 402 fixed to slidable pushrods 404 of the type described previously. Inner and outer cylindrical, brush elements 406 and 408 are attached to support 402. The bristles of the brush elements, which may be made of nylon, for example, are configured to engage the external surface of inner electrode 354 and the inner surface of outer electrode 352. Accordingly, as elements 406 and 408 are moved along electrodes 352 and 354 by pushrods 404 and support 402, the collected material is scraped from the electrodes.

Figure 22:
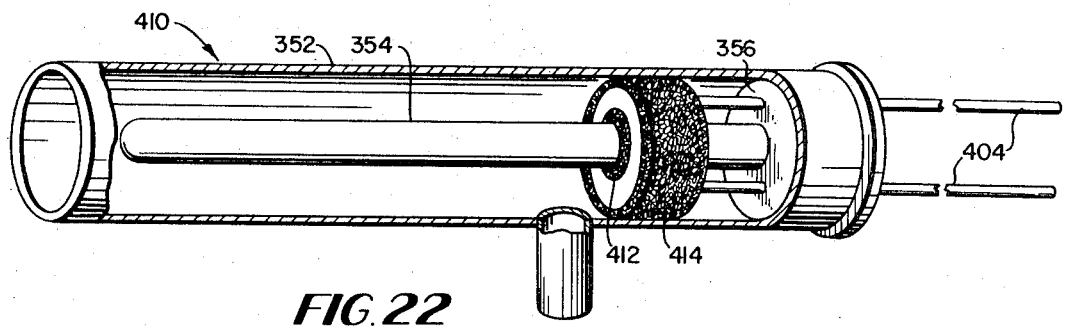

The cleaning device of the separation unit 410 illustrated in FIG. 22 is identical to that illustrated in FIG. 21 except that sponge-like cleaning elements 412 and 414 are substituted for the brush elements of the latter to scrub collected material from the outer electrode 352 and inner electrode 354.

Collected material may also be efficiently disposed of in many applications by converting it to a non-toxic gas. For example, collected carbon particles can be converted to carbon dioxide and discharged from a separation unit with the gas from which the particles are separated.

Figure 23:
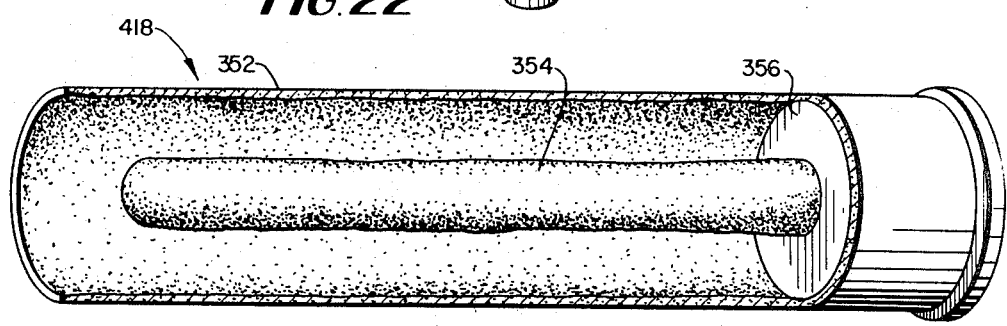

FIG. 23 illustrates a separation unit 418 designed to dispose of collected material in the manner just described. More specifically, in this unit, the exposed surface of collecting electrode 354 (preferably, also the inner surface of outer electrode 352) is coated with an oxidation catalyst such as activated carbon. Particles propelled to the inner electrode or scattered to the outer electrode of unit 418 will accordingly be converted to carbon dioxide and pass from the unit with the gas or gases being cleaned.

The conversion can also be achieved by heating the center electrode to a temperature at which the collected carbon will oxidize into carbon dioxide. The heating may be achieved by employing an electric element to heat the surface of the inner electrode. This electrode in turn radiates heat to the surfaces of the outer electrode so that any material adhered to the latter will also be converted. By this inherently efficient heat radiator-receiver arrangement, good conversion is obtainable at the expense of relatively little heating power.

It is to be understood, in conjunction with this embodiment of the invention, that conversions of the type just described are not restricted to applications where only carbon particles are involved. Other compounds or elements can be similarly converted by use of appropriate temperatures and/or catalysts.

Figure 24:
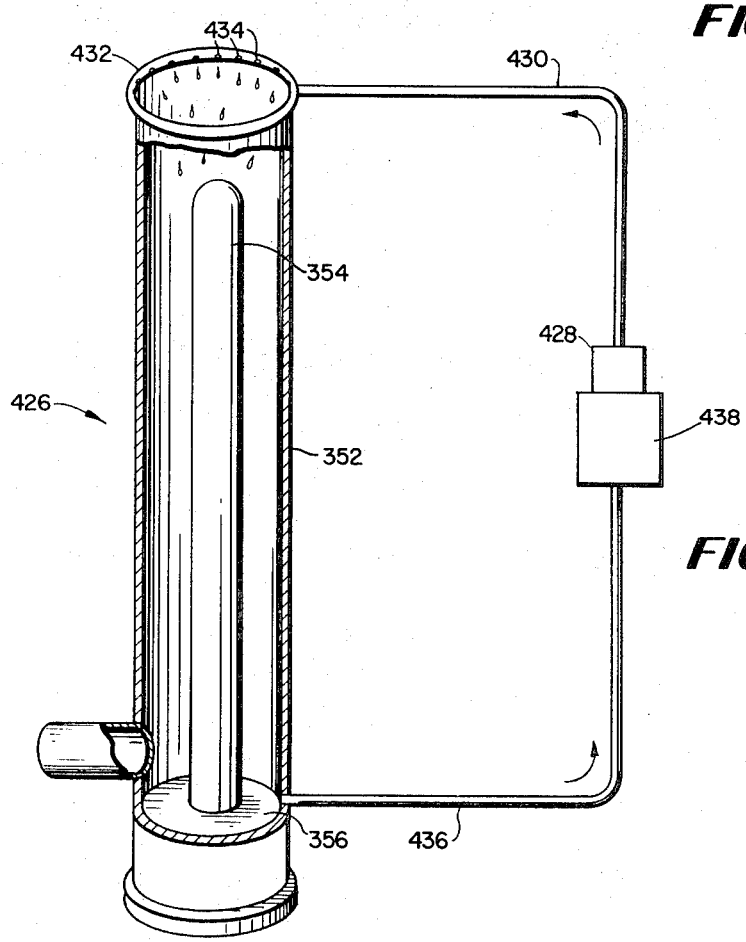

In the separation unit 426 illustrated in FIG. 24, a cleaning fluid such as a low conductivity oil is circulated by pump 428 through supply line 430 to an annular distributor 432. From distributor 432, the cleaning fluid is discharged through nozzles 434 onto inner electrode 354 (or both electrodes 354 and 352) to form a film therearound. The cleaning liquid flows down over the electrode or electrodes, picking up the material collected thereon. At the bottom of the unit the cleaning liquid and contaminants are circulated through line 436 to a filter 438 where the contaminant is removed.

Figure 28:
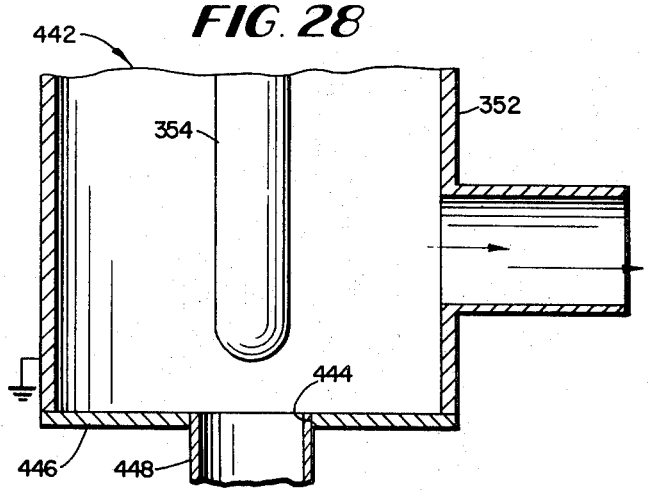
FIG. 28 is a partial vertical section through a device in accord with the principles of the invention which is designed for collecting liquids.

FIG. 28 illustrates a separation unit 442 of the cylindrical electrode type modified for applications involving liquid recovery. In this unit, the separated liquid is collected on inner electrode 354. The liquid then trickles down the conductor under the influence of gravity and flows through an opening 444 in the separation unit bottom wall 446 into liquid conduit 448 or, alternatively, into an appropriate receptacle (not shown).

The following examples illustrate the application of the principles of the invention to the solution of specific separation problems. A fully instrumented test loop was used to generate the data contained in the examples. The loop consists of a pollutant generating section, a diagnostic section and a test section. Liquid or solid pollutants are introduced into the test loop and are mixed with metered quantities of air from a large fan in the pollutant generating section. The amount of pollutant and air thus introduced determines the desired pollutant concentration. The pollutant-air mixture is then piped through a diagnostic section where the flow rate, temperature, pressure, velocity and humidity can be measured.

The pollutant mixture then enters the test section where the separator under examination is positioned. Sampling probes positioned upstream and downstream from the separator at appropriate locations sample the pollutant stream and gravimetrically measure the amount of pollutant in a known volume of passed air. The efficiency of the separator is calculated from the measured samples according to nationally accepted standards.

EXAMPLE I

A room air cleaning unit as shown in FIG. 9 was designed, constructed and tested. The unit consisted of a rectangular structure which had a cross sectional area of approximately 1 square foot and an overall length of 1 foot. The cleaning section of the unit was comprised of 270 hexagonal cells 3¾ inches across the flat and 3 inches long, which constituted outer conductors and were grounded. An equal number of ¼ inch diameter metallic cylinders supported concentrically in the hexagonal honeycomb cells comprised the high voltage center or inner conductors.

The gas to be cleaned was passed through the cells at a flow rate of 15 cubic feet per minute.

The central cylindrical conductors were electrically energized to 5 kV; and a total current of 10 microamperes was caused to pass between the inner and outer conductors.

The gas to be cleaned consisted of a mixture of DOP (0.3 $\mu$ diameter particles) at a concentration of 1 mg/liter of air. It was found that 60 percent of the DOP was consistently removed by the cleaning device after a single pass through the 3 inch long cleaning section. Thus, the results indicate that the present process is highly efficient in removing very small particles from a flowing gas (a similar device with an active length of 9 inches is capable of removing 98.4 percent of the initial particle concentration in a single pass).

The room air cleaning unit described above was also operated by passing a mixture of A.C. Fine Dust and air through its cleaning section.

At the voltage, current, and flow rate values identified above, the 3 inch long uint was 93 percent efficient in removing the A.C. Fine Dust from the air during a single pass through the cleaning section.

EXAMPLE II

A 7 foot long separator having the electrode configuration shown in FIG. 3 with a 6 inch diameter outer electrode and a 2⅛ inch diameter center electrode was attached to an automotive diesel engine capable of generating 110 cubic feet per minute of diesel exhaust. When the central electrode was energized to 40 kV with the outer electrode grounded, the separator removed 85 percent by weight of the particulate in the diesel exhaust. This exhaust contained an initial 0.25 mg/liter of solid particulate exhaust product.

The current consumption at the 20 kV level did not exceed 100 microamperes with the insulator between the outer and control electrodes free of exhaust products. This amounted to a power consumption of 2 watts.

Even is five such units are required to clean the exhaust from an average sized diesel truck, for example, the power requirement is only 10 watts, which is not excessive. A battery operated power supply could be employed to operate such a separator, and the separator would accordingly be amenable to mobile installations.

EXAMPLE III

An existing 24 inch diameter incinerator smoke stack was equipped as shown in FIG. 5 with a central electrode which consisted of a 3 inch steel tube, 16 feet long, positioned concentrically in the middle of the smoke stack. The steel tube was attached to the hub of a ring and spoke structure which was in turn rested on three conventional high tension wire ceramic insulators, again as shown in FIG. 5. These insulators electrically isolated the 3 inch steel tube, the ring, and the spokes from the rim of the smoke stack.

A dense black smoke was created by burning rubber in the incinerator. This smoke was passed into the atmosphere through the smoke stack. The steel tube was energized to a voltage of 95 kV, and a 0.5 milliampere current was caused to flow between the inner electrode and the wall of the smoke stack. This caused a reduction of the smoke level coming out of the stack from a Ringelmann No. 4 indication to a Ringelmann No. 1 indication (from an opacity indication of 80 to 20 percent).

These results indicate that the separator is versatile in that it is capable of being adapted to existing fixed installations and in that the separator can operate in a high temperature environment such as in process stack gases.

EXAMPLE IV

A spherical separator as shown in FIG. 8 was designed, constructed, and tested with A.C. Fine Test Dust. The electrodes of the separator consisted of two concentric aluminum spheres. The outer sphere had a 28 inch diameter, while the inner sphere had a 14.1 inch diameter. The inner sphere was concentrically supported in the outer conductor and electrically isolated therefrom by a single nylon rod. A high voltage lead was connected at the top of the inner sphere through a voltage bushing in the outer sphere. The outer sphere was grounded.

The A.C. Fine Test Dust was passed through the device at 60.8 and 100 CFM. The inner spherical electrode was energized to 100 kilovolts for both flowrates. The current drawn by the device varied from 80 to 9 microamperes. The removal efficiency for the device at 100 kV was 77 percent for 60.8 CFM and 54.2 percent for 100 CFM.

EXAMPLE V

A variety of concentric cylinder, low temperature separators having the electrode arrangement of FIG. 3 were designed and tested. The operating characteristics and the pollutants tested are tabulated below for representative tests. The distinguishing characteristis of all these separators are: high efficiency at low power consumption and negligible ozone generation due to the extremely low current.

| Outer Tube ID (in.) | Inner Tube OD (in.) | Length (ft.) | Inner Tube Cover | Pollutant | | | Voltage (kV) | Current ($\mu$A) | Efficiency (%) |
|---|---|---|---|---|---|---|---|---|---|
| | | | | Type | Flow Rate (l/min.) | Concentration (mg/l) | | | |
| 1.9 | 0.25 | 2 | bare | A.C. Fine Dust | 900 | 1.30 | 24.5 | 236 | 81.0 |
| | 0.875 | 2 | epoxy + silica | A.C. Fine Dust | 900 | 1.00 | 24 | 2.5 | 48.0 |
| | 0.6875 | 1 | polyurethane | DOP | 1.0 | 0.62 | 14 | 0 | 96.0 |
| 5.875 | 2.0 | 4 | polyurethane | DOP | 1100 | 2.8 | 60 | 0 | 96.0 |
| 7.875 | 3.0 | 6 | glass cloth | A.C. Fine Dust | 2830 | 0.72 | 50 | 7 | 66.0 |
| | 2.0 | 6 | glass cloth | A.C. Fine Dust | 2830 | 0.79 | 60 | 20 | 90.0 |
| | 2.0 | 10 | glass cloth | talc | 2830 | 0.96 | 70 | 48 | 93.6 |
| | 3.0 | 10 | glass cloth | talc | 2830 | 0.89 | 70 | 86 | 94.2 |
| 9.875 | 2.0 | 10 | glass cloth | A.C. Fine Dust | 2830 | 0.82 | 70 | 122 | 86.6 |
| | 2.0 | 10 | glass cloth | A.C. Coarse Dust | 2830 | 0.86 | 70 | 30 | 84.3 |
| | 3.0 | 4 | bare | DOP | 390 | 1.7 | 90 | 0 | 99.0 |
| | 3.0 | 4 | polyurethane | DOP | 390 | 1.7 | 90 | 0 | 95.0 |

EXAMPLE VI

A gasoline engine exhaust cleaning unit was designed, constructed and tested. The electrodes of the unit consisted of concentric metallic cylinders with an overall length of 4 feet. The outer tube internal diameter was 6 inches, the inner tube was 2 inches in diameter, and it was wrapped in glass cloth. The active cleaning length of the unit was 2½ feet between intake and exhaust ports.

The gas to be cleaned was passed through the concentric structure at a flow rate of 7.4 cubic feet per minute. The central electrode was electrically energized to 25 kV, and currents of 20 to 50 microamperes were caused to pass between the concentric electrodes.

The gas to be cleaned consisted of the exhaust from a small one-cylinder spark ignition gasoline engine run on leaded gas and deliberately tuned to produce a high concentration of pollutants in the exhaust. It was found that 96 percent of the total and lead particulates were removed by a single pass through the 2½ foot long cleaning section. The results were certified by an independent testing laboratory.

EXAMPLE VII

As mentioned above, one of the important advantages of the present invention is that it is insensitive to the accumulation of particles on the electrode or conductor where the particles are collected. That is, the efficiency does not decrease as the layer of material on the collecting surface increases in thickness.

To demonstrate this, tests were run on a device having the electrical configuration shown in FIG. 3 in accord with the testing protocol described above. The device had a 2 inch diameter outer conductor and a 2 foot long inner electrode ⅛ inch in diameter. The pollutant was A.C. Fine Dust at a concentration of 0.8 mg/liter. The voltage across the inner and outer conductors was 20 kV, and the rate of flow was 30.4 cubic feet per minute.

Figure 25:
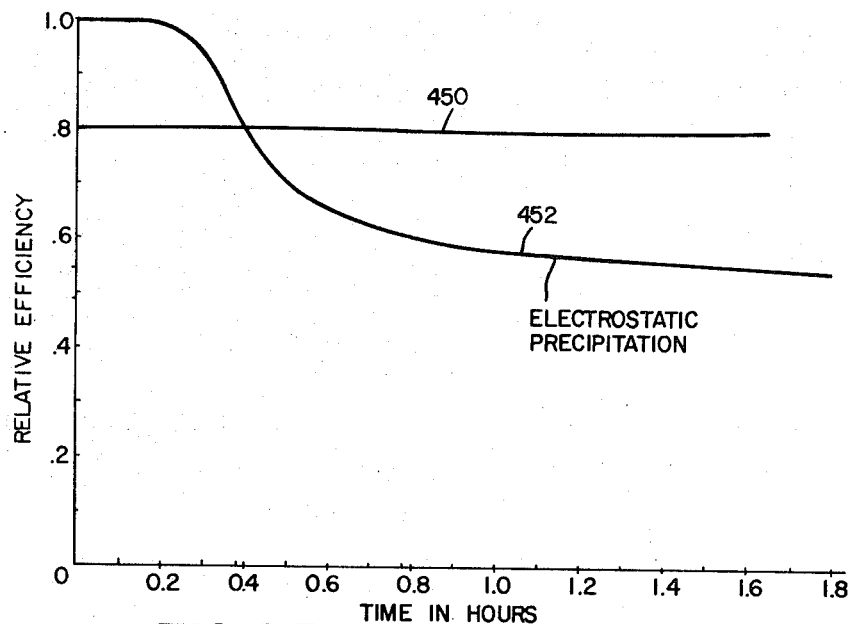
FIG. 25 is a graph in which the performance of apparatus in accord with the principles of the present invention is compared to the performance of an electrostatic precipitator.

Curve 450 of FIG. 25 shows that the collection efficiency remained constant over a period of approximately 1.8 hours although no collected material was removed from the inner electrode.

An inner conductor of smaller diameter (0.125 inches) was then installed in the same outer conductor causing corona discharge so that the particles were charged as they entered the electrical field. In this case the device, now operating as an electrostatic precipitator, initially operated at a higher efficiency than in the initial test as shown by Curve 452. However, the efficiency rapidly decreased, reaching that of the device as initially operated in about 23 minutes and a 25 percent lower efficiency in approximately 47 minutes. By the end of the test period, the efficiency of the device operated as an electrostatic precipitator was only 70 percent of that obtained in the initial test in which the device was operated in accord with the principles of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

I claim:

1. A method of separating particles of solid and liquid substances from air and other gases, which comprises the steps of:
   a. establishing a non-uniform electrical field between first and second electrically isolated electrode means by impressing across said electrode means a voltage which is such that the maximum value of the non-uniform electrical field is below the breakdown strength of the gas from which flow particles are to be separated;
   b. effecting a flow of the gas in which the particles to be separated are dispersed through a passage between said first and second electrode means to thereby cause said gas and the particles to be separated therefrom to traverse and interact with the non-uniform electrical field, whereby the force created by said field will move said particles to the region of the non-uniform field in which the field intensity is highest;
   c. polarizing the gas in which the particles to be separated are dispersed without charging the particles to the point where they will move by electrophoresis so that said gas will move with said particles to the region of the field in which the particles are to be collected to thereby reduce to a minimum the drag forces on the particles attributable to the movement of the particles in the gas and increase the efficiency of the separation process; and
   d. collecting in the region of the field in which the field intensity is the highest particles moving thereto with the gas in which they are dispersed under the influence of the nonuniform field.

2. A method of separating particles of solid and liquid substances from air and other gases, comprising the steps of:
   a. establishing a non-uniform electrical field between first and second electrode means, at least one of which has one or more flow passages therethrough, said field being established by impressing across said electrode means a voltage which is such that the maximum value of the non-uniform electrical field is below the breakdown strength of the gas from which flow particles are to be separated;
   b. effecting a flow of the gas in which the particles to be separated are dispersed through said one electrode means to the other of the electrode means to thereby cause said gas and the particles to be separated therefrom to traverse and interact with the non-uniform electrical field, whereby the force created by said field will move said particles to the region of the non-uniform field in which the field intensity is highest;
   c. polarizing the gas in which the particles to be separated are dispersed so that said gas will move with said particles to the region of the field in which the particles are to be collected to thereby reduce to a minimum the drag forces on the particles and increase the efficiency of the separation process; and
   d. collecting in the region of the field in which the field intensity is the highest particles moving thereto with the gas in which they are dispersed under the influence of the nonuniform field.

3. A method of separating particles of solid and liquid substances from air and other gases flowing through a conduit means having an electrically conductive inner surface, comprising the steps of:
- a. disposing an electrode means in said conduit means;
- b. establishing a non-uniform field between said electrode means and said conduit means, said non-uniform field being established by impressing across said electrode means and said conduit means a voltage which is such that the maximum value of the non-uniform field is below the breakdown strength of the gas from which flow particles are to be separated;
- c. effecting a flow of the gas in which the particles to be separated are dispersed through said conduit means to thereby cause said gas and the particles to be separated therefrom to traverse and interact with the non-uniform electrical field, whereby the force created by said field will move said particles to the region of the non-uniform field in which the field intensity is highest;
- d. polarizing the gas in which the particles to be separated are dispersed so that said gas will move with said particles to the region of the field in which the particles are to be collected to thereby reduce to a minimum the drag forces on the particles attributable to the motion of the particles in the gas and increase the efficiency of the separation process; and
- e. collecting in the region of the field in which the field intensity is the highest particles moving thereto with the gas in which they are dispersed under the influence of the non-uniform field.

4. The method of claim 3, wherein the inner surface of the conduit means is made electrically conductive by disposing a coating of an electrically conductive material thereon.

5. A method of separating particles of solid and liquid substances from air and other gases, which comprises the steps of:
- a. establishing a non-uniform electrical field between first and second electrically isolated electrode means by impressing across said electrode means a voltage which is such that the maximum value of the non-uniform electrical field is below the breakdown strength of the gas from which flow particles are to be separated;
- b. effecting a flow of the gas in which the particles to be separated are dispersed through a passage between said first and second electrode means to thereby cause said gas and the particles to be separated therefrom to traverse and interact with the non-uniform electrical field, whereby the force created by said field will move said particles to the region of the non-uniform field in which the field intensity is highest;
- c. creating and maintaining a current between said first and second electrode means such that the maximum current density in the non-uniform field is not more than $10^{-6}$ amperes per square centimeter to thereby reduce to a minimum the drag forces on the particles attributable to the movement of the particles in the gas and increase the efficiency of the separation process; and
- d. collecting in the region of the field in which the field intensity is the highest particles moving thereto with the gas in which they are dispersed under the influence of the non-uniform field.

6. The method of claim 5, wherein the particles are collected at one of said electrode means and including the step of removing from said electrode means the particles collected thereat by vibrating said electrode means.

7. The method of claim 5, wherein the particles are collected at one of said electrode means and including the step of removing from said electrode means the particles collected thereat by directing a flow of fluid against said electrode means.

8. The method of claim 5, wherein the particles are collected at one of said electrode means and including the step of removing from said electrode means the particles collected thereat by vacuuming the collected particles from the electrode means.

9. The method of claim 5, wherein the particles are collected at one of said electrode means and including the step of removing from said electrode means the particles collected thereat by moving a means having cleaning elements engageable with said electrode means relative thereto.

10. The method of claim 5, wherein the particles are collected at one of said electrode means and including the step of removing from said electrode means the particles there collected by flexing the portion of the electrode means on which said particles are separated to thereby free the collected particles from said electrode.

11. The method of claim 5, wherein the electrode means have curved surface portions and wherein the voltage impressed across the electrode means is maintained at a level where $$\text{grad} \, |E|^2 \leq 4 \, |E^2 \max| \, 1/a,$$

where grad $|E|^2$ is the gradient of the field squared, $E_{max}$ is the breakdown field strength of the gas in which the particles are dispersed, and $1/a$ is the maximum curvature of any equipotential line in the non-uniform field.

12. The method of claim 5, wherein at least one of the electrode means has a flat surface portion and wherein the voltage impressed across the electrode means is maintained at a level where $$\text{grad} \, |E|^2 \leq 2 \, |E \max| \, 1/a,$$

where grad $|E|^2$ is the gradient of the field squared, $E_{max}$ is the breakdown field strength of the gas in which the particles are dispersed, and $1/a$ is the maximum curvature of any field line in the non-uniform field.

* * * * *

UNITED STATES PATENT OFFICE
CERTIFICATE OF CORRECTION

Patent No. 3,818,678　　　　　　　　　Dated June 25, 1974

Inventor(s) Nicholas Gothard

It is certified that error appears in the above-identified patent and that said Letters Patent are hereby corrected as shown below:

Column 1, line 7, delete the "comma" after "division".

Column 3, line 30, change "molecules" to --molecule--.

Column 4, line 49, change "stream" to --steam--.

Column 5, lines 49 and 50, change "drawing" to --drawings--.

Column 6, line 7, delete the "9".

Column 8, Table 1, line 2, insert --k-- before "= 2.5".

Column 9, line 4, change "AS" to --As--.

Column 9, equation 10, change "v -" to --v = --.

Column 10, Table III, insert --k-- above "Composite Fluid" on a line equal with "R".

Column 11, line 14, insert --k-- above "1,3 to 2.3".

Column 11, line 15, change "1,3" to --1.3--.

Column 12, line 29, change "is" (second occurrence) to --as--.

Column 14, line 42, change "via.," to --viz.,--.

Table IV, bottom of column 12, delete all that lies below the line under "Epoxy Foam with Solica Filler"

Column 16, Table V, change "$10^2$" to --$10^{2\frac{1}{2}}$--.

Column 18, line 35, change "143" to --148--.

UNITED STATES PATENT OFFICE
CERTIFICATE OF CORRECTION

Page 2

Patent No. 3,818,678　　　　Dated June 25, 1974

Inventor(s) Nicholas Gothard

It is certified that error appears in the above-identified patent and that said Letters Patent are hereby corrected as shown below:

Column 20, line 65, change "any" to --an--.

Columns 27 amd 28, table at bottom of page, at right most column, penultimate line, change "99.0" to --90.0--.

Column 27, line 45, change "is" to --if--.

Column 29, line 37, change "1/3" to --7/8--.

Claim 2, column 30, line 65, insert a --hyphen-- between the words "non uniform".

Signed and sealed this 8th day of October 1974.

(SEAL)
Attest:

McCOY M. GIBSON JR.
Attesting Officer

C. MARSHALL DANN
Commissioner of Patents